United States Patent
Park

(10) Patent No.: US 11,789,107 B2
(45) Date of Patent: Oct. 17, 2023

(54) METHOD FOR ADJUSTING PHASE OF SIGNAL TO BE INPUT TO MULTIPLE ANTENNAS, AND ELECTRONIC DEVICE IMPLEMENTING METHOD

(71) Applicant: Samsung Electronics Co., Ltd., Suwon-si (KR)

(72) Inventor: Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 17/269,144

(22) PCT Filed: Aug. 22, 2019

(86) PCT No.: PCT/KR2019/010662
§ 371 (c)(1),
(2) Date: Feb. 17, 2021

(87) PCT Pub. No.: WO2020/040554
PCT Pub. Date: Feb. 27, 2020

(65) Prior Publication Data
US 2021/0313682 A1    Oct. 7, 2021

(30) Foreign Application Priority Data
Aug. 22, 2018   (KR) .......................... 10-2018-0098182

(51) Int. Cl.
*G01S 3/50*     (2006.01)
*H01Q 3/26*     (2006.01)
(Continued)

(52) U.S. Cl.
CPC ............... *G01S 3/50* (2013.01); *G01S 3/043* (2013.01); *H01Q 3/2617* (2013.01);
(Continued)

(58) Field of Classification Search
CPC ...... G01S 3/043; G01S 3/46–50; G01S 3/023; G01S 3/74; H04B 7/043; H04B 7/086
See application file for complete search history.

(56) References Cited

U.S. PATENT DOCUMENTS 4,888,593 A * 12/1989 Friedman .................. G01S 3/50
                                                                    342/382
7,062,246 B2 * 6/2006 Owen .................. H04B 7/0602
                                                                    455/562.1
(Continued)

FOREIGN PATENT DOCUMENTS

CN         107729627 A      2/2018
JP    WO2006/016402 A1      5/2008
(Continued)

OTHER PUBLICATIONS

Korean Office Action dated Nov. 17, 2022, issued in Korean Patent Application No. 10-2018-0098182.
(Continued)

Primary Examiner — Cassi J Galt
(74) Attorney, Agent, or Firm — Jefferson IP Law, LLP

(57) ABSTRACT

Disclosed are various embodiments relating to a method and device for estimating the angle of a base station transmission beam by calculating the time difference between reception signals acquired through simultaneous beam sweeping to multiple antenna arrays. According to various embodiments, an electronic device may comprise: one or more first antennas; one or more second antennas spaced predetermined distance apart from the one or more first antennas; and a communication circuit electrically connected to the one or more first antennas and the one or more second antennas, wherein the communication circuit acquires a designated signal output from a base station as a first reception signal through the one or more first antennas and a second reception signal through the one or more second antennas, the first
(Continued)

reception signal and the second reception signal are transmitted as one base station transmission beam, the time difference between the first reception signal and the second reception signal is obtained, the angle of the one base station transmission beam is calculated at least on the basis of the predetermined distance and the time difference, and the phase of a signal to be input to the one or more first antennas or the one or more second antennas is adjusted on the basis of the angle. Various embodiments are possible.

15 Claims, 15 Drawing Sheets

(51) Int. Cl.
*H01Q 21/06* (2006.01)
*H04B 7/04* (2017.01)
*G01S 3/04* (2006.01)
*H04B 7/08* (2006.01)
*H04B 7/0426* (2017.01)

(52) U.S. Cl.
CPC ......... *H01Q 21/062* (2013.01); *H01Q 21/065* (2013.01); *H04B 7/043* (2013.01); *H04B 7/086* (2013.01)

(56) References Cited

U.S. PATENT DOCUMENTS

| | | | | |
|---|---|---|---|---|
| 7,414,578 | B1 * | 8/2008 | Courtade | ................ G01S 3/023 342/372 |
| 10,754,002 | B1 * | 8/2020 | Gibbons | ................ G01S 3/801 |
| 2005/0250564 | A1 | 11/2005 | Kishigami et al. | |
| 2007/0249400 | A1 | 10/2007 | Kaneko et al. | |
| 2012/0033761 | A1 | 2/2012 | Guo et al. | |
| 2012/0194377 | A1 | 8/2012 | Yukumatsu et al. | |
| 2017/0227623 | A1 | 8/2017 | Park et al. | |
| 2018/0076520 | A1 | 3/2018 | Ma | |
| 2018/0331739 | A1 * | 11/2018 | Nilsson | ................ H04B 7/0408 |
| 2019/0007121 | A1 | 1/2019 | Zhinong et al. | |
| 2020/0041603 | A1 | 2/2020 | Stephens et al. | |

FOREIGN PATENT DOCUMENTS

| | | |
|---|---|---|
| JP | 2010-243237 A | 10/2010 |
| JP | 2012-159349 A | 8/2012 |
| KR | 10-2015-0146333 A | 12/2015 |
| WO | 2017/079839 A1 | 5/2017 |
| WO | 2017/108117 A1 | 6/2017 |

OTHER PUBLICATIONS

Extended European Search Report dated Nov. 26, 2021, issued in European Patent Application No. 19853035.4-1216.
Partial European Search Report dated Aug. 11, 2021, issued in European Patent Application No. 19853035.4-1216.
Korean Office Action dated May 4, 2023, issued in Korean Patent Application No. 10-2018-0098182.
European Office Action dated Jun. 23, 2023, issued in European Patent Application No. 19 853 035.4.
Korean Office Action dated Jul. 20, 2023, issued in Korean Patent Application No. 10-2018-0098182.

* cited by examiner

FIG. 3
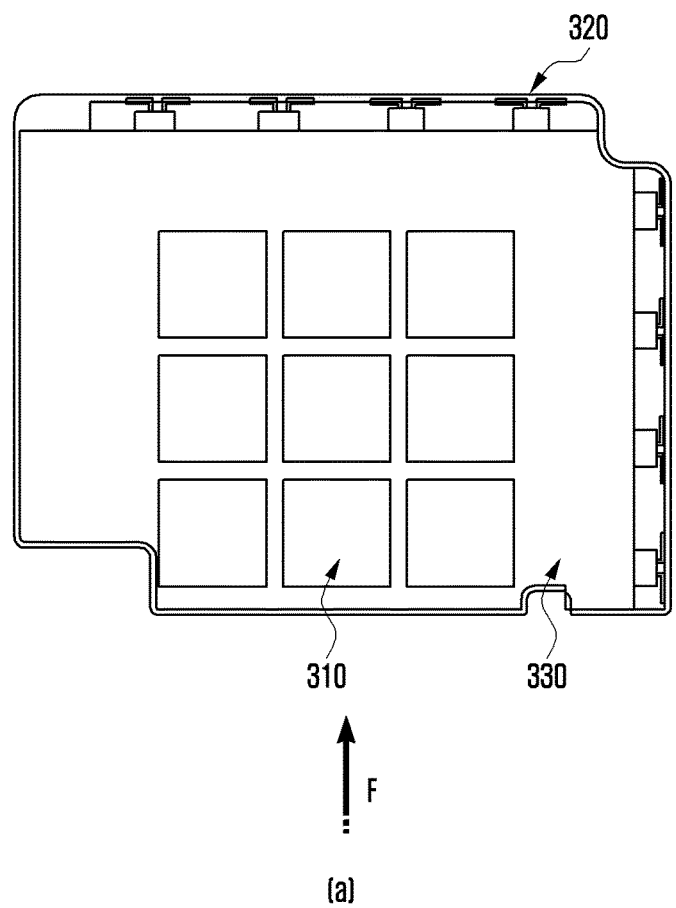
(a)
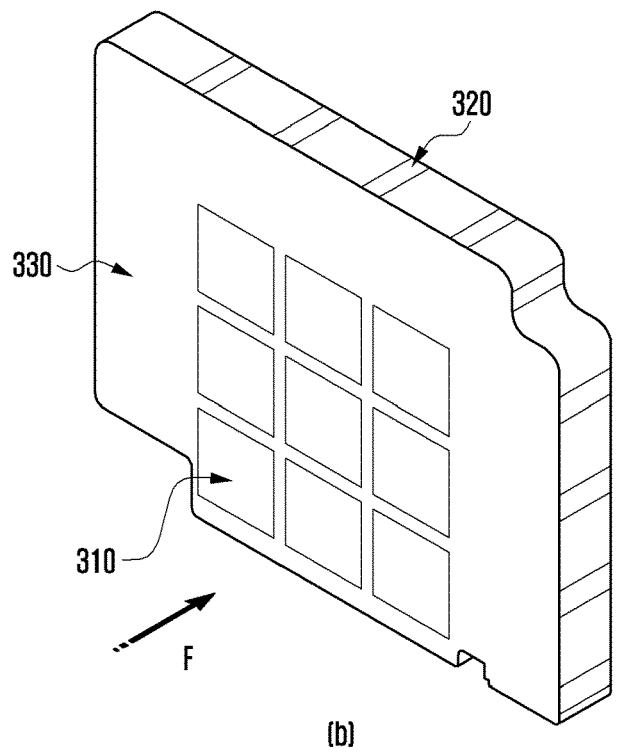
(b)

FIG. 9
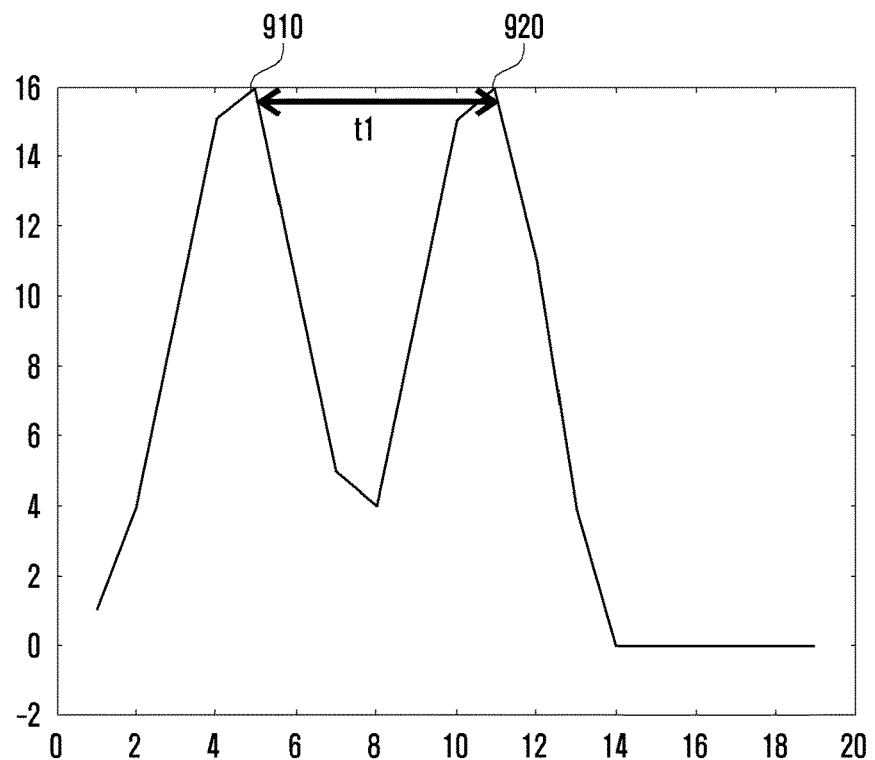
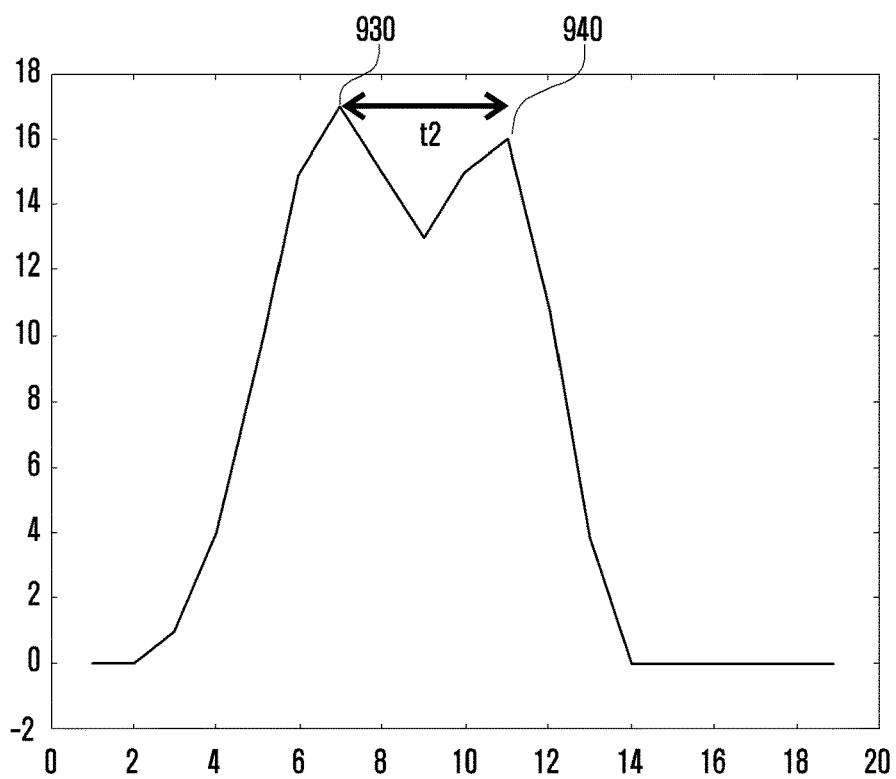

FIG. 11
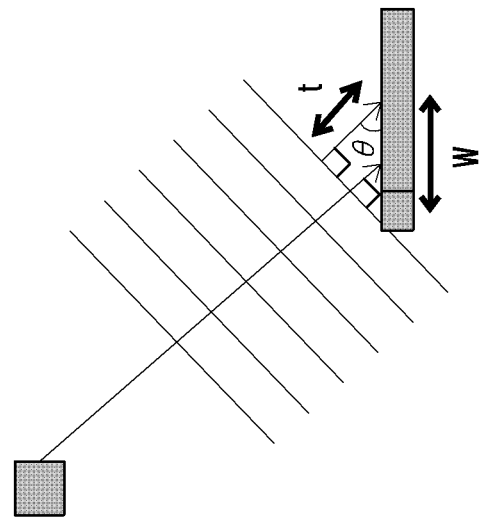
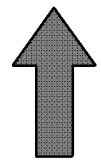
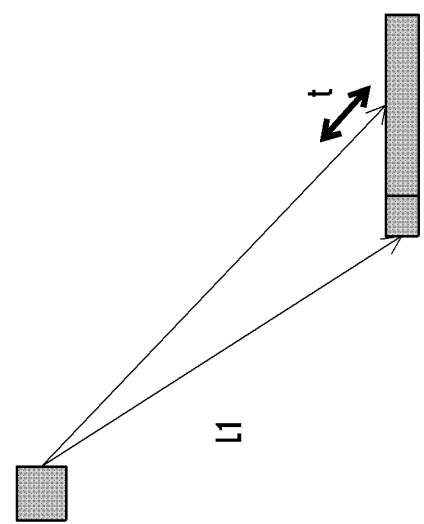

METHOD FOR ADJUSTING PHASE OF SIGNAL TO BE INPUT TO MULTIPLE ANTENNAS, AND ELECTRONIC DEVICE IMPLEMENTING METHOD

TECHNICAL FIELD

Various embodiments disclose a method of adjusting the phase of a signal input to a plurality of antennas (e.g., antenna arrays) in a mobile communication environment using a high frequency band such as a millimeter wave (mmWave) band, and an electronic device implementing the method.

BACKGROUND ART

Recently, with the development of new technology for high-quality multimedia services, wireless traffic increases explosively every year, and research on mobile communication related to the fifth generation (5G) that can efficiently cope with this increase in wireless traffic is being actively conducted.

For example, because the cellular band currently used in mobile communication is already saturated, as a way to deal with the rapidly increasing wireless traffic, there has been proposed a technology for expanding the operating frequency band by securing a wider frequency band (e.g., 28 GHz band, 38 GHz band, or 60 GHz band) based on a high frequency band (or, mmWave band) (e.g., 30 to 300 GHz bands) such as a millimeter wave band.

Recently, research is underway to apply ultra-high-speed short-range wireless communication technology using millimeter-wave band frequencies to various fields such as home networks. In general, the millimeter wave band has propagation characteristics including strong propagation straightness and strong propagation attenuation due to oxygen molecules. For this reason, research is underway to increase the communication distance in the millimeter wave band based on a beamforming technology using antenna arrays.

For example, as the number of arrays increases, the beam width may decrease and the gain by the antenna may increase proportionally. Hence, in a system with severe radio wave attenuation such as 60 GHz, at least four to dozens of antenna arrays can be used to increase the gain by the antenna array.

However, since the beam width may decrease as the array increases to increase the antenna gain, the beam direction must be accurately aligned between the transmitter and the receiver. For example, if the direction is mismatched between the transmitter and the receiver, the gain for the signal of the antenna array may decrease rapidly compared to the signal of a single antenna, and hence accurate and rapid detection of the angle of arrival can be very important.

DISCLOSURE OF INVENTION

Technical Problem

Generally, in a high frequency band, the beam width becomes very narrow and the straightness of the radio wave becomes strong while the diffraction property is weakened, so if the base station and the electronic device fail to operate appropriately transmission and reception beams according to a change in the location of the electronic device, communication may be not performed. Hence, it may be important for the base station to form transmission and reception antenna beams directed to the electronic device at an accurate angle. Also, it may be important for the electronic device to form transmission and reception antenna beams accurately directed to the base station. To form such optimal transmission and reception antenna beams, it may be necessary to estimate an accurate angle at which the base station or the electronic device is located.

Various embodiments disclose a method and apparatus for adjusting the phase of a signal input to plural antennas in an electronic device including a plurality of antennas.

Various embodiments disclose a method and apparatus that can obtain reception signals through simultaneous beam sweeping of different antenna arrays formed on one circuit board and calculate the time difference between two reception signals through cross correlation between the obtained reception signals to thereby estimate the angle of the base station transmission beam.

Various embodiments disclose a method and apparatus that can receive a beam training signal using different antenna arrays, estimate the location of the base station using the same, and appropriately adjusting the antenna arrays according to the estimated location of the base station.

Various embodiments disclose a method and apparatus that can estimate the angle of arrival through cross correlation between a synchronization signal (e.g., beam training symbols) and a reception signal in an electronic device including plural antenna arrays.

Various embodiments disclose a method and apparatus that can estimate the angle of arrival by using a time difference between two peaks calculated based on cross correlation between reception signals obtained through plural antenna arrays.

Solution to Problem

According to various embodiments of the disclosure, an electronic device may include: one or more first antennas; one or more second antennas spaced apart by a specified distance from the one or more first antennas; and a communication circuit electrically connected to the one or more first antennas and the one or more second antennas, wherein the communication circuit may be configured to: obtain a designated signal output from a base station as a first reception signal through the one or more first antennas and as a second reception signal through the one or more second antennas, wherein the first reception signal and the second reception signal may be transmitted as one base station transmission beam; identify a time difference between the first reception signal and the second reception signal; calculate an angle of the base station transmission beam at least based on the specified distance and the time difference; and adjust a phase of a signal input to the one or more first antennas or the one or more second antennas at least based on the angle.

According to various embodiments of the disclosure, an electronic device may include: a first antenna array including a plurality of first antennas; a second antenna array including a plurality of second antennas; a communication circuit electrically connected to the first antenna array and the second antenna array; and a processor, wherein the processor may be configured to: enable the first antenna array and the second antenna array at the same time; sweep beams of the first antenna array and beams of the second antenna array in a same direction; combine a first reception signal obtained through the first antenna array and a second reception signal obtained through the second antenna array; detect two peaks through cross correlation between the combined signal and a known synchronization signal; determine a time difference between the first reception signal and the second reception signal based on the detected peaks; estimate an angle of a base station transmission beam based on the time difference; and determine an antenna array for communication with a base station based on the angle of the base station transmission beam.

According to various embodiments of the disclosure, an operation method of an electronic device may include: obtaining a first reception signal through one or more first antennas and a second reception signal through one or more second antennas from one base station transmission beam; identifying a time difference between the first reception signal and the second reception signal; calculating an angle of the base station transmission beam at least based on a specified distance between the first antennas and the second antennas and the time difference; and adjusting a phase of a signal input to the one or more first antennas or the one or more second antennas at least based on the angle.

Advantageous Effects of Invention

The electronic device according to various embodiments can obtain reception signals through simultaneous beam sweeping of different antenna arrays formed on one circuit board and calculate the time difference between two reception signals through cross correlation between the obtained reception signals to thereby effectively estimate the angle of the base station transmission beam.

BRIEF DESCRIPTION OF DRAWINGS

FIG. 3 is a diagram illustrating an example in which antenna arrays are arranged in the electronic device according to various embodiments.

FIG. 9 is a diagram depicting an example of estimating a time difference between a first reception signal and a second reception signal in various embodiments.

FIGS. 10 and 11 are diagrams illustrating an example of estimating the beam angle in various embodiments.

MODE FOR DISCLOSURE

Figure 1:
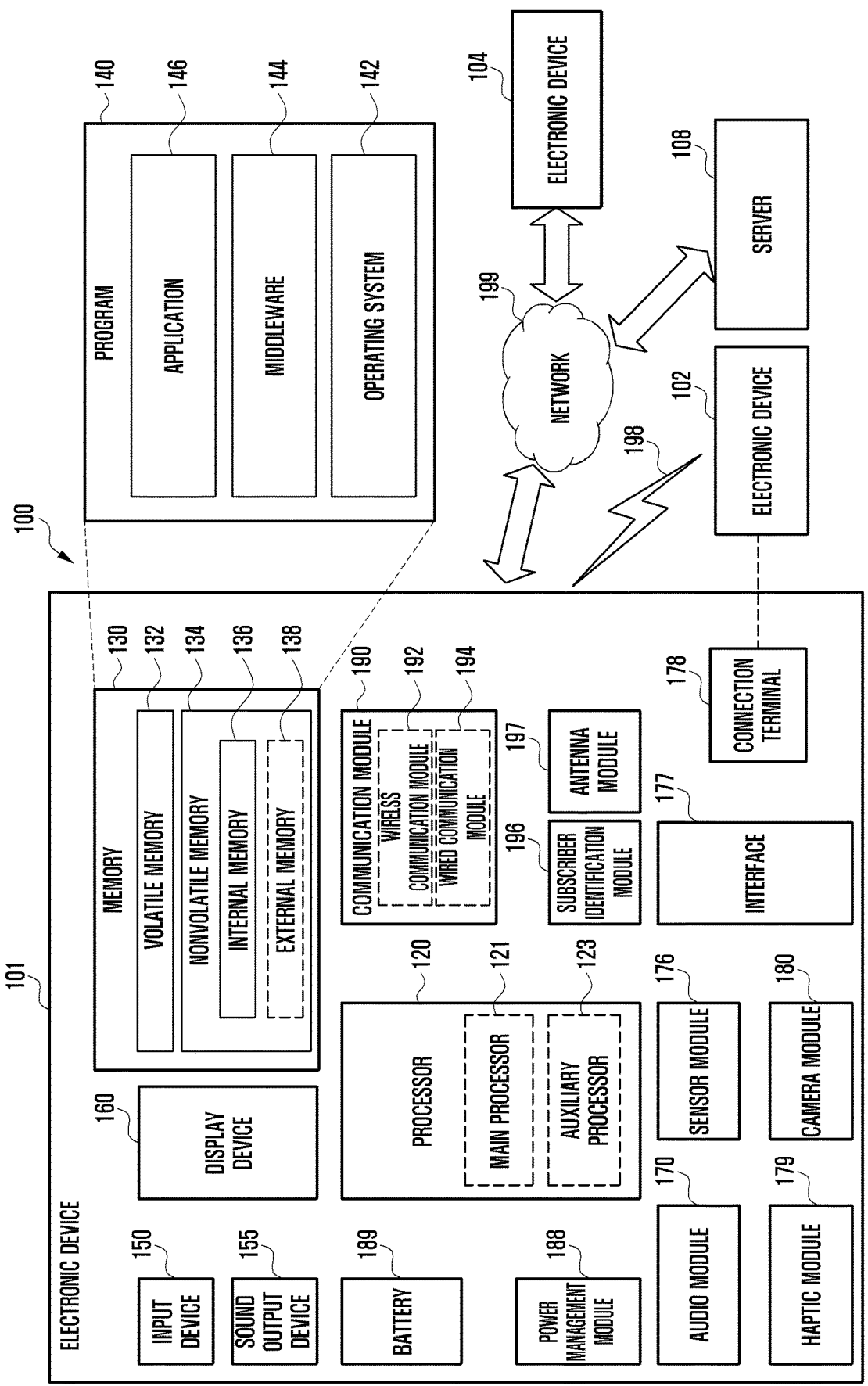
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., an RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
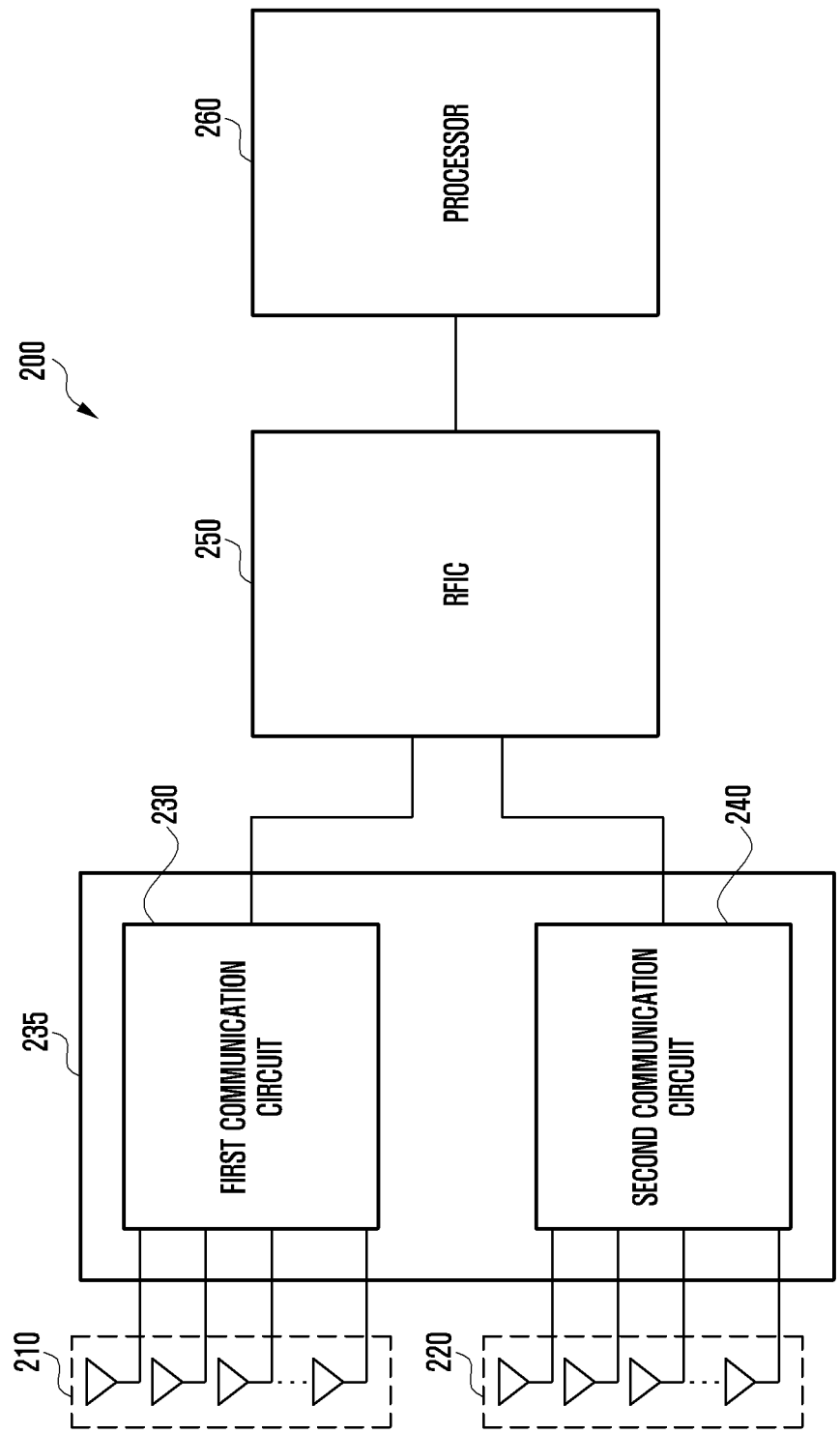
FIG. 2A is a diagram schematically illustrating the configuration of a communication chip set including antenna arrays in an electronic device according to various embodiments.

FIG. 2A is a diagram schematically illustrating the configuration of a communication chipset 200 including antenna arrays in the electronic device 101 according to various embodiments.

With reference to FIG. 2A, the communication chipset 200 (e.g., communication module 190, antenna module 197 in FIG. 1) according to various embodiments may include, for example, a first antenna array 210, a second antenna array 220, a communication circuit 235, a radio frequency integrated circuit (RFIC) 250, and a processor 260 (e.g., processor 120 of FIG. 1, or communication processor (CP)).

In a certain embodiment, the RFIC 250 may include a control unit (e.g., control circuit including at least one processing circuitry) capable of performing at least some functions of the processor 260.

According to various embodiments, the first antenna array 210 may include one or more first antennas. In various embodiments, the first antennas may be formed on one surface of a circuit board (e.g., printed circuit board) using patch antennas. For example, the first antenna array 210 may include a patch antenna array.

According to various embodiments, the second antenna array 220 may include one or more second antennas. In various embodiments, the second antennas may be formed on another surface of the circuit board (e.g., side surface of the circuit board) different from the one surface using dipole antennas. For example, the second antenna array 220 may include a dipole antenna array.

According to various embodiments, the communication circuit 235 may be electrically connected to the first antenna array 210 and the second antenna array 220. According to an embodiment, the communication circuit 235 may transmit and receive signals to and from the outside (e.g., base station) through at least one of the first antenna array 210 or the second antenna array 220. According to an embodiment, the communication circuit 235 may receive a designated signal (e.g., first signal, second signal) output from the outside through at least one of the first antenna array 210 or the second antenna array 220. According to various embodiments, the communication circuit 235 may be configured to include a first communication circuit 230 and a second communication circuit 240.

According to an embodiment, the first communication circuit 230 may be electrically connected to the first antenna array 210. According to an embodiment, the first communication circuit 230 may be electrically connected to the first antenna array 210 and may transmit and receive signals to and from the outside (e.g., base station). According to an embodiment, the first communication circuit 230 may receive a first signal among designated signals output from the outside through the first antenna array 210.

According to an embodiment, the second communication circuit 240 may be electrically connected to the second antenna array 220. According to an embodiment, the second communication circuit 240 may be electrically connected to the second antenna array 220 and may transmit and receive signals to and from the outside (e.g., base station). According to an embodiment, the second communication circuit 240 may receive a second signal (or, second reception signal) among designated signals output from the outside through the second antenna array 220.

According to various embodiments, the RFIC 250 may process a signal and transmit it to the outside (e.g., base station) through the communication circuit 235 (e.g., first communication circuit 230, second communication circuit 240), and may process a signal (e.g., first signal or second signal) obtained through the communication circuit 235 from the outside. According to an embodiment, the RFIC 250 may include components related to processing transmission and reception of signals. According to one embodiment, the RFIC 250 may include a switch (not shown) (e.g., Tx/Rx switch) to select the path for transmitting and receiving a signal, an RF transmitter (not shown) (e.g., transmitter), an RF receiver (not shown) (e.g., receiver), and the like.

According to an embodiment, the switch may be implemented with, for example, a single pole double throw (SPDT) switch. According to an embodiment, the switch may function to exclusively connect the antenna array (e.g., first antenna array 210, second antenna array 220) to the transmitting end (e.g., transmitter) and the receiving end (e.g., receiver) in, for example, a system operating in a time division manner (e.g., time division duplex (TDD)).

According to an embodiment, although not shown, the receiver may include a filter, a low noise amplifier (LNA), a mixer, a buffer, or a voltage controlled oscillator (VCO). According to an embodiment, although not shown, the transmitter may include a filter, a power amplifier (PA), a driver, or a VCO.

According to various embodiments, the power amplifier (PA) is, for example, a high-efficiency power amplifier to which a power-efficient technology for supporting millimeter waves is applied, and Doherty technique, envelope elimination and restoration (EER) technique, linear amplification using non-linear components (LINC) technique, Class-S PA technique, or envelope tracking (ET) technique may be used for example. According to an embodiment, the low power amplifier (LNA) may remove noise from the overall receiving end through, for example, low noise matching. According to an embodiment, the filter of the receiving end (e.g., receiver) and the transmitting end (e.g., transmitter) may pass only a signal band (e.g., 28 GHz, 39 GHz, 60 GHz, etc.) required by the system, and may remove other unnecessary frequency signals. For example, the filter, which may be located before the power amplifier (PA) at the transmitting end or may be located after the low-noise amplifier (LNA) at the receiving end, can attenuate unnecessary signals.

According to various embodiments, the processor 260 may estimate the angle of arrival from a signal received from the base station. According to various embodiments, the processor 260 may simultaneously receive a beam training signal by using different antenna arrays (e.g., first antenna array 210, second antenna array 220), utilize this to estimate the location of the base station, and appropriately adjust (or select) the antenna arrays according to the estimated location of the base station. According to an embodiment, the processor 260 may obtain a first signal through the first antenna array 210 from among designated signals (e.g., base station transmission beams) output from the base station, obtain a second signal through the second antenna array 220, and identify the time difference between the obtained first signal and second signal.

According to an embodiment, the processor 260 may calculate the angle of the base station transmission beam at least based on a specified distance for separation between the first antenna array 210 and the second antenna array 220 and the time difference between the first signal and the second signal. According to an embodiment, the processor 260 may adjust the phase of a signal input to the first antenna array 210 or the second antenna array 220 at least based on the calculated angle. A detailed description will be given of the processor 260 that selects an antenna array (or phase adjustment) through estimation of the angle of arrival according to various embodiments with reference to the following drawings.

Figure 2B:
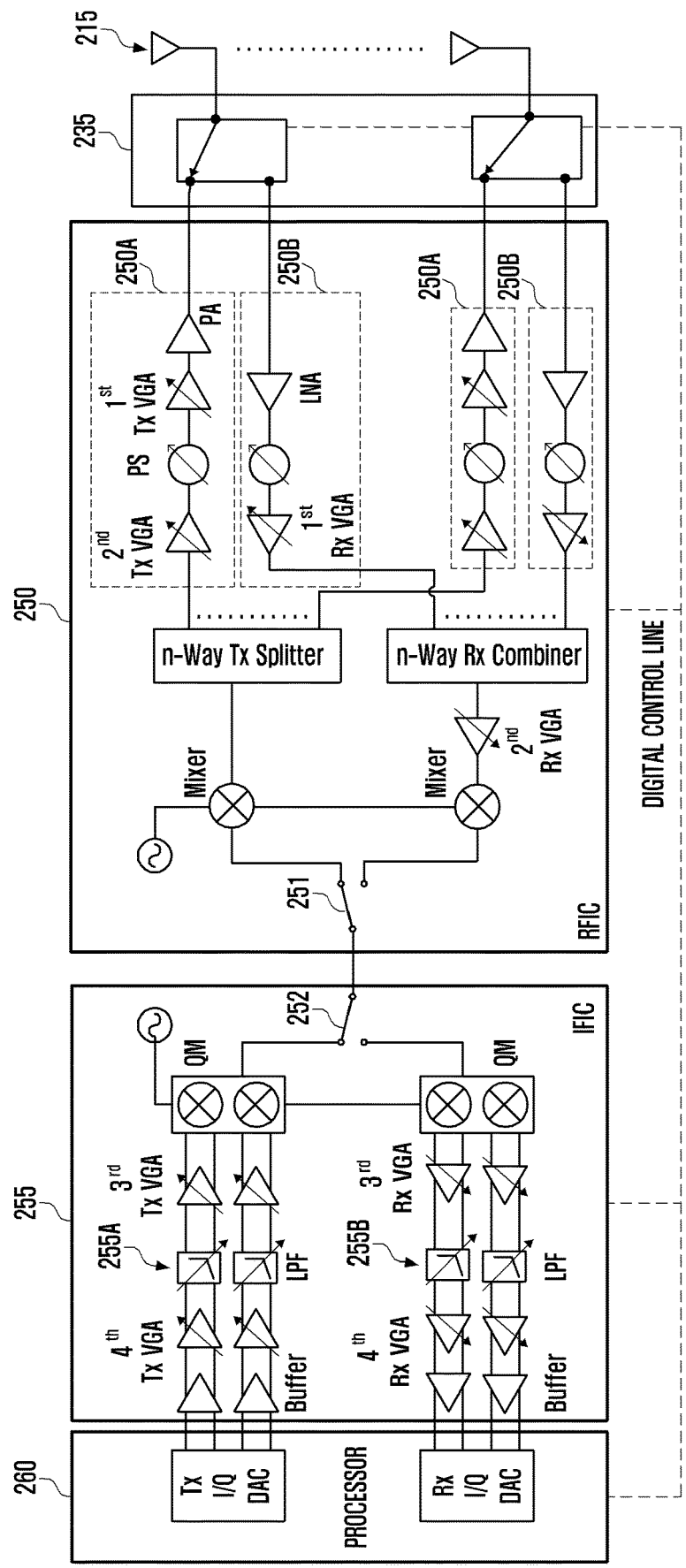
FIG. 2B is a diagram schematically illustrating an example of a circuit configuration of the communication chipset in the electronic device according to various embodiments.

FIG. 2B is a diagram schematically illustrating an example of a circuit configuration of the communication chipset 200 in the electronic device 101 according to various embodiments.

With reference to FIG. 2B, FIG. 2B may show an example of a beamforming communication circuit capable of processing one data stream with n chains. In FIG. 2B, digital control lines inside the circuit are omitted. According to an embodiment, digital control lines of the processor 260 (e.g., CP), IFIC 255, RFIC 250, or switch 235 (or path selector) may be composed of, for example, MIPI, I2C, PCIe, UART, USB, or GPIO.

According to various embodiments, n antennas 215 may be placed to be apart (or spaced) by a distance d. The antennas 215 may be connected to the switch 235 (or path selector), and may be selectively connected to the transmitting (Tx) chain 250A for transmission (Tx) and to the receiving (Rx) chain 250B for reception (Rx) during, for example, TDD communication.

According to various embodiments, the Tx chain 250A may include, for example, a power amplifier (PA), a first variable gain amplifier (VGA) (e.g., 1st Tx VGA), a phase shifter (PS), a second VGA (e.g., 2nd Tx VGA), a n-way splitter (e.g., Tx splitter), and a mixer within the RFIC 250.

According to an embodiment, the PA may perform high power amplification of the Tx signal. According to an embodiment, the PA may be mounted inside the RFIC 250, or may be mounted outside the RFIC 250.

According to an embodiment, each of the VGAs (e.g., 1st Tx VGA, 2nd Tx VGA) may perform a Tx auto gain control (AGC) operation under the control of the processor 260. According to an embodiment, the number of VGAs may increase or decrease depending on the case.

According to an embodiment, the PS may shift the phase of a signal according to the beamforming angle under the control of the processor 260.

According to an embodiment, the n-way splitter may divide a transmission (Tx) signal received from the mixer to generate n signals.

According to an embodiment, the mixer may up-convert a transmission intermediate frequency (Tx-IF) signal received from the IFIC 255 being an intermediate frequency (IF) processing circuit to a transmission (Tx) signal (e.g., RF band). According to an embodiment, the mixer may receive a signal to be mixed from an internal or external oscillator.

According to various embodiments, the Rx chain 250B may include, for example, a low-noise amplifier (LNA), a PS, a first VGA (e.g., 1st Rx VGA), a n-way combiner (e.g., Rx combiner), a second VGA (e.g., 2nd Rx VGA), and a mixer within the RFIC 250.

According to an embodiment, the LNA may perform low-noise amplification of a signal received from the antennas 215.

According to an embodiment, each of the VGAs (e.g., 1st Rx VGA, 2nd Rx VGA) may perform an Rx AGC operation under the control of the processor 260. According to an embodiment, the number of VGAs may increase or decrease depending on the case.

According to an embodiment, the PS may shift the phase of a signal according to the beamforming angle under the control of the processor 260.

According to an embodiment, the n-way combiner may combine signals that are phase shifted and aligned in phase. The combined signal may be transmitted to the mixer via, for example, the second VGA (e.g., 2nd Rx VGA).

According to an embodiment, the mixer may down-convert a reception signal from the RF band to the IF band. According to an embodiment, the mixer may receive a signal to be mixed from an internal or external oscillator.

According to various embodiments, a switch 251 for selectively connecting the Rx/Tx chain may be further included after the mixer in the RFIC 250. For example, when the IF frequency is high, it may be difficult to connect a transmission line (or communication line) between the RFIC 250 and the IFIC 255, but the number of transmission lines of the RFIC 250 and IFIC 255 can be reduced by selectively connecting the Tx/Rx chain through the switch 251 during TDD operation.

According to various embodiments, the IFIC 255 may further include a switch 252 for selectively connecting the Rx/Tx chain as in the case of the RFIC 250.

According to various embodiments, the Tx chain 255A inside the IFIC 255 may include, for example, a quadrature mixer (QM), a third VGA (e.g., 3rd Tx VGA), a low pass filter (LPF), a fourth VGA (e.g., 4th Tx VGA), and a buffer.

According to an embodiment, the buffer acts as a buffer when receiving an in-phase/quadrature phase (I/Q) signal (e.g., balanced Tx I/Q signal) from the processor 260 for stable signal processing.

According to an embodiment, the third VGA (e.g., 3rd Tx VGA) and the fourth VGA (e.g., 4th Tx VGA) may play a role of Tx AGC under the control of the processor 260.

According to an embodiment, the LPF may serve as a channel filter by operating the bandwidth of a baseband transmission (Tx) I/Q signal as a cutoff frequency. In various embodiments, the cutoff frequency may be variable.

According to an embodiment, the quadrature mixer (QM) may up-convert an I/Q signal (e.g., balanced Tx I/Q signal) to a transmission (Tx) intermediate frequency signal (e.g., Tx-IF signal).

According to various embodiments, the Rx chain 255B inside the IFIC 255 may include a quadrature mixer (QM), a third VGA (e.g., 3rd Rx VGA), an LPF, and a fourth VGA (e.g., 4th Rx VGA), and a buffer.

According to an embodiment, the buffer may act as a buffer when transferring an I/Q signal (e.g., balanced Rx I/Q signal) having passed the fourth VGA (e.g., 4th Rx VGA) to the processor 260 for stable signal processing.

According to an embodiment, the third VGA (e.g., 3rd Rx VGA) and the fourth VGA (e.g., 4th Rx VGA) may play a role of Rx AGC under the control of the processor 260.

According to an embodiment, the LPF may serve as a channel filter by operating the bandwidth of a baseband I/Q signal (e.g., balanced Rx I/Q signal) as a cutoff frequency. In various embodiments, the cutoff frequency may be variable.

According to an embodiment, the quadrature mixer (QM) may down-convert a reception (Rx) intermediate frequency signal (e.g., Rx-IF signal) to generate an I/Q signal (e.g., balanced Rx I/Q signal).

According to various embodiments, the processor 260 may internally include a Tx I/Q digital to analog converter (DAC) and an Rx I/Q analog to digital converter (ADC). According to an embodiment, the Tx I/Q DAC in the processor 260 may convert a digital signal modulated by the modem into a transmission (Tx) signal (e.g., balanced Tx I/Q signal) and transmit it to the IFIC 255. According to an embodiment, the Rx I/Q ADC in the processor 260 may convert a reception (Rx) signal (e.g., balanced Rx I/Q signal) down-converted by the IFIC 255 into a digital signal and transmit it to the modem.

According to various embodiments, some of the n antennas 215 may be included in the first antenna array (e.g., first antenna array 210 in FIG. 2A). According to various embodiments, the rest of the n antennas 215 may be included in the second antenna array (e.g., second antenna array 220 in FIG. 2A).

According to various embodiments, when signals are simultaneously received by the first antenna array and the second antenna array, the simultaneously received signals may be combined (or summed) at the n-way combiner (e.g., n-way Rx combiner).

FIG. 3 is a diagram illustrating an example in which antenna arrays 310 and 320 are arranged in the electronic device 101 according to various embodiments.

With reference to FIG. 3, according to various embodiments, the antenna structure of the electronic device 101 may be formed by arranging plural antenna arrays (e.g., first antenna array 310 (e.g., first antenna array 210 in FIG. 2A), second antenna array 320 (e.g., second antenna array 220 in FIG. 2A)) in a distributed manner According to various embodiments, the antenna arrays 310 and 320 may each be configured to include a plurality of antennas. In FIG. 3, illustration (A) and illustration (B) show an example in which the antenna arrays 310 and 320 are formed to be spaced apart by a specified distance on different surfaces of the circuit board 330 (e.g., PCB), where illustration (A) may show a plan view and illustration (B) may show a three-dimensional view with respect to illustration (A).

According to various embodiments, the type of an antenna structure may be configured as an array including a combination of at least some of, for example, a patch antenna, a dipole antenna, or a folded antenna. According to an embodiment, the first antenna array 310 may be configured as a patch antenna array. According to an embodiment, the second antenna array 320 may be configured as a dipole antenna array.

According to various embodiments, the first antenna array 310 and the second antenna array 320 may be formed to be spaced apart by a specified distance between the first antenna array 310 and the second antenna array 320 on the circuit board 330 of the electronic device 101. According to an embodiment, the first antenna array 310 may be formed on a first surface of the circuit board 330, and the second antenna array 320 may be formed on a second surface of the circuit board 330. According to an embodiment, the first and second surfaces are intended to indicate different surfaces on the circuit board 330 and may distinguish the front surface and the side surface (e.g., upper side surface, right side surface, left side surface, or lower side surface with respect to the front surface) in a direction F facing the circuit board 330 for example.

According to various embodiments, as shown in FIG. 3, the first antenna array 310 and the second antenna array 320 may be formed on one circuit board 330, and one of the first antenna array 310 and the second antenna array 320 may be formed on a side surface of the circuit board 330 with being spaced apart from the other antenna array by a specified distance on the circuit board 330.

Figure 4:
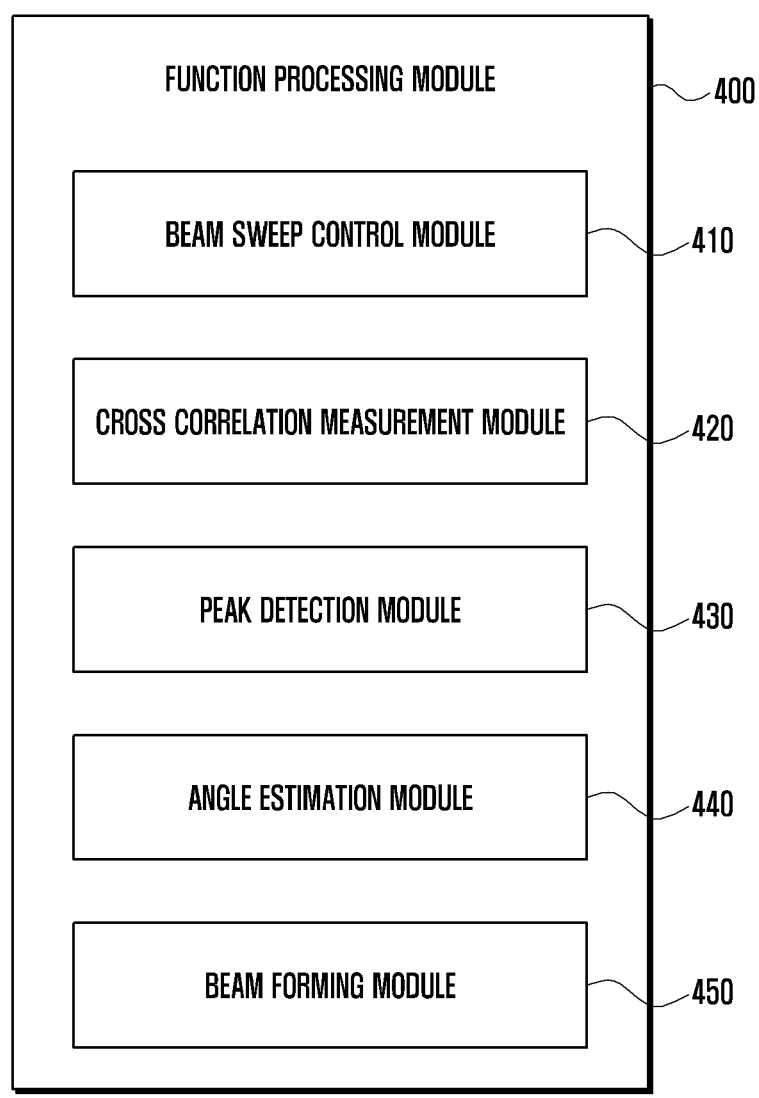
FIG. 4 is a diagram illustrating an example of a function processing module in the electronic device according to various embodiments.

FIG. 4 is a diagram illustrating an example of a function processing module 400 in the electronic device 101 according to various embodiments.

As shown in FIG. 4, in various embodiments, FIG. 4 shows an example of a module (e.g., function processing module 400) that performs functions related to beam training of plural antenna arrays (e.g., first antenna array 310 and second antenna array 320 in FIG. 3) according to estimation of the angle of arrival based on a reception signal from the base station in a mobile communication environment using a high frequency band. For example, in various embodiments, FIG. 4 may show an example of the function processing module 400 related to simultaneously receiving beam training signals using different antenna arrays, estimating the location of the base station using these, and adjusting (or selecting) the antenna arrays appropriately according to the estimated location of the base station. In various embodiments, the function processing module 400 may be included as a hardware module or a software module in the processor including processing circuitry (e.g., processor 120 in FIG. 1 or processor 260 in FIG. 2A or FIG. 2B).

With reference to FIG. 4, the function processing module 400 may include a beam sweep module 410, a cross correlation measurement module 420, a peak detection module 430, an angle estimation module 440, and a beam forming module 450.

In various embodiments, the beam sweep module 410 may simultaneously sweep beams of different antenna arrays (e.g., first antenna array 310 and second antenna array 320 in FIG. 3) in the same direction.

In various embodiments, the cross correlation measurement module 420 may calculate a cross correlation for a known synchronization signal (or synchronization symbols) while sweeping the beams of the first antenna array 310 and the second antenna array 320. According to an embodiment, the synchronization signal may be a training symbol predetermined (or known) between the base station and the electronic device 101. According to an embodiment, the cross correlation measurement module 420 may obtain a first reception signal through the first antenna array 310 and obtain a second reception signal through the second antenna array 320 while the beam sweep module 410 is sweeping the beams of the first antenna array 310 and the second antenna array 320. According to an embodiment, the reception signals (e.g., first reception signal, second reception signal) may include a synchronization signal (e.g., beam training symbols). According to an embodiment, the first reception signal and the second reception signal may be combined into one signal by an n-way combiner (e.g., Rx combiner). According to an embodiment, the cross correlation measurement module 420 may take a cross correlation between the combined signal and a known synchronization signal (e.g., training symbols). An example for this is disclosed by Equation 1 and Equation 2 described later.

In various embodiments, the peak detection module 430 may determine whether a peak related to the first reception signal and the second reception signal is detected based on the calculation result of the cross correlation measurement module 420. According to an embodiment, when a peak is detected, the peak detection module 430 may determine whether the detected peak is plural peaks.

In various embodiments, when two peaks are detected through the cross correlation for the first reception signal and the second reception signal, the angle estimation module 440 may calculate a time difference between the two peaks, and estimate the angle (e.g., angle of arrival) of a beam (e.g., one base station transmission beam) based on the time difference. In various embodiments, the time difference between the two peaks may correspond to a delay time between the first reception signal and the second reception signal. According to an embodiment, one of the first reception signal and the second reception signal (e.g., first time series signal) may arrive first at one antenna array (e.g., first antenna array 310), and the other reception signal (e.g., second time series signal) may arrive at the other antenna array (e.g., second antenna array 320) at a time point delayed by some time. In various embodiments, a detailed description will be given of estimating peaks through cross correlation between a signal obtained by combining (or summing) the first and second reception signals and a known synchronization signal, and estimating the angle of the beam based on the time difference between the peaks with reference to the drawings to be described later.

In various embodiments, the beam forming module 450 may select at least one appropriate antenna array among the first antenna array 310 or the second antenna array 320 based on the estimated angle of the beam. For example, the beam forming module 450 may adjust the phase of a signal input to the first antenna array 310 or the second antenna array 320 at least based on the estimated angle.

According to various embodiments of the disclosure, an electronic device 101 may include: one or more first antennas (e.g., first antenna array 210 or 310 in FIG. 2A or 3); one or more second antennas (e.g., second antenna array 220 or 320 in FIG. 2A or 3) spaced apart by a specified distance from the one or more first antennas; and a communication circuit (e.g., communication circuit 235 in FIG. 2A or FIG. 2B or processor 260 in FIG. 2A or FIG. 2B) electrically connected to the one or more first antennas and the one or more second antennas, wherein the communication circuit may be configured to: obtain a designated signal output from a base station as a first reception signal through the one or more first antennas and as a second reception signal through the one or more second antennas, wherein the first reception signal and the second reception signal may be transmitted as one base station transmission beam; identify the time difference between the first reception signal and the second reception signal; calculate the angle of the base station transmission beam at least based on the specified distance and the time difference; and adjust the phase of a signal input to the one or more first antennas or the one or more second antennas at least based on the angle.

According to various embodiments, the communication circuit may calculate the time difference based on a peak value of a signal obtained by combining the first reception signal and the second reception signal.

According to various embodiments, the communication circuit may estimate peaks through cross correlation between the signal obtained by combining the first reception signal and the second reception signal and a known synchronization signal, and calculate the angle of the base station transmission beam based on the time difference between the peaks.

According to various embodiments, the communication circuit may obtain a reception signal by beam sweeping the first antennas and the second antennas in the same order.

According to various embodiments, the first antennas may include a patch antenna array composed of patch antennas, and the second antennas may include a dipole antenna array composed of dipole antennas.

According to various embodiments, the first antennas and the second antennas may be formed on one circuit board (e.g., circuit board 330 in FIG. 3).

According to various embodiments, the first antennas may be formed on one surface of the circuit board, and the second antennas may be formed on a surface of the circuit board different from the one surface.

According to various embodiments, the communication circuit may include a first communication circuit and a second communication circuit, wherein the first communication circuit may be formed to be electrically connected to the first antennas and the second communication circuit may be formed to be electrically connected to the second antennas.

According to various embodiments, the communication circuit may include a first communication circuit and a second communication circuit, wherein the first communication circuit may be formed to be electrically connected to the first antennas and the second antennas and the second communication circuit may be formed to be electrically connected to third antennas and fourth antennas.

According to various embodiments, the communication circuit may determine a third direction between a beam in a first direction by the first communication circuit and a beam in a second direction by the second communication circuit, and obtain a reception signal at least based on the first direction, the second direction and the third direction.

According to various embodiments of the disclosure, an electronic device 101 may include: a first antenna array (e.g., first antenna array 210 or 310 in FIG. 2A or 3) including a plurality of first antennas; a second antenna array (e.g., second antenna array 220 or 320 in FIG. 2A or 3) including a plurality of second antennas; a communication circuit (e.g., communication circuit 235 in FIG. 2A or 2B) electrically connected to the first antenna array and the second antenna array; and a processor (e.g., processor 120 or 260 in FIG. 1 or FIG. 2A or 2B), wherein the processor may be configured to: enable the first antenna array and the second antenna array at the same time; sweep beams of the first antenna array and beams of the second antenna array in the same direction; combine a first reception signal obtained through the first antenna array and a second reception signal obtained through the second antenna array; detect two peaks through cross correlation between the combined signal and a known synchronization signal; determine a time difference between the first reception signal and the second reception signal based on the detected peaks; estimate the angle of a base station transmission beam based on the time difference; and determine the antenna array for communication with the base station based on the angle of the base station transmission beam.

According to various embodiments, the first antenna array and the second antenna array may be formed to be spaced apart by a specified distance on a circuit board.

According to various embodiments, one of the first antenna array and the second antenna array may be formed on one surface of the circuit board, and the other may be formed on a side surface of the circuit board.

According to various embodiments, the processor may estimate the angle of the base station transmission beam at least based on a preset lookup table or an approximation method.

According to various embodiments, the first antenna array may include a patch antenna array composed of patch antennas, and the second antenna array may include a dipole antenna array composed of dipole antennas.

Figure 5:
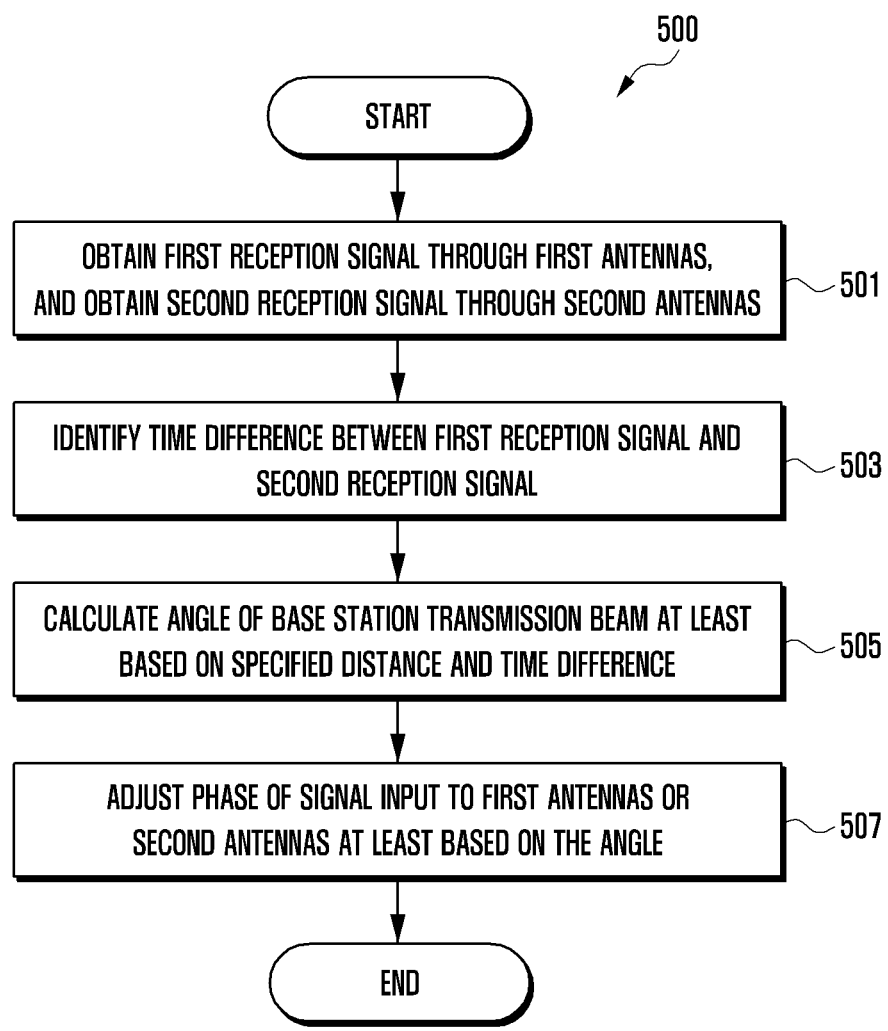
FIG. 5 is a flowchart illustrating an operation method of the electronic device according to various embodiments.

FIG. 5 is a flowchart 500 illustrating an operation method of the electronic device 101 according to various embodiments.

With reference to FIG. 5, at operation 501, the processor 120 (e.g., at least one processor including a processing circuit) (or communication chipset 200 in FIG. 2A, or function processing module 400 in FIG. 4) of the electronic device 101 may obtain a first reception signal through first antennas (e.g., first antenna array 310 in FIG. 3) and obtain a second reception signal through second antennas (e.g., second antenna array 320 in FIG. 3). According to an embodiment, the first antennas and the second antennas may be arranged to be spaced apart based on a specified distance on a circuit board (e.g., circuit board 330 in FIG. 3), and may each be configured to include one or more antennas. According to an embodiment, the processor 120 may receive a first signal (e.g., first reception signal) through the first antennas and receive a second signal (e.g., second reception signal) through the second antennas from a designated signal output from the base station. For example, the first reception signal and the second reception signal may be delivered to the first antennas and the second antennas based on a transmission beam transmitted by one base station (hereinafter, referred to as "base station transmission beam").

At operation 503, the processor 120 (e.g., angle estimation module 440 in FIG. 4) may identify a time difference between the first reception signal and the second reception signal. According to an embodiment, the processor 120 may calculate the time difference based on a first arrival time at which the first reception signal has arrived at the first antennas and a second arrival time at which the second reception signal has arrived at the second antennas. According to an embodiment, the processor 120 may estimate a delay time between the first reception signal and the second reception signal by calculating the time difference.

At operation 505, the processor 120 (e.g., angle estimation module 440 in FIG. 4) may calculate the angle of one base station transmission beam at least based on the specified distance and the time difference. According to an embodiment, the first antennas and the second antennas may be arranged to be spaced apart by the specified distance within the electronic device 101 (or circuit board (e.g., circuit board 330 in FIG. 3) inside the electronic device 101), and the first reception signal may reach the first antennas at a first time and the second reception signal may reach the second antennas at a second time (e.g., a time different from the first time). According to an embodiment, the processor 120 may calculate the angle of the base station transmission beam at least based on the time difference between the first time and the second time, and the specified distance between the first antennas and the second antennas.

At operation 507, the processor 120 (e.g., beam forming module 450 in FIG. 4) may adjust the phase of a signal input to the first antennas or the second antennas at least based on the calculated angle. According to an embodiment, the processor 120 may select the first antennas or the second antennas at least based on the calculated angle and communicate with the base station by using the selected antennas (e.g., antenna array). According to an embodiment, the processor 120 may adjust the phase related to the antenna arrays (or elements (e.g., antennas) constituting antenna arrays) by using a lookup table illustrated in in Table 1 below.

TABLE 1

| | Phase shifter value | | | |
|---|---|---|---|---|
| Beam angle (°) | Ant 1 | Ant 2 | Ant 3 | Ant 4 |
| −30 | 0 | −90 | −180 | −270 |
| −15 | 0 | −45 | −90 | −135 |
| 0 | 0 | 0 | 0 | 0 |
| 15 | 0 | 45 | 90 | 135 |
| 30 | 0 | 90 | 180 | 270 |

Figure 6:
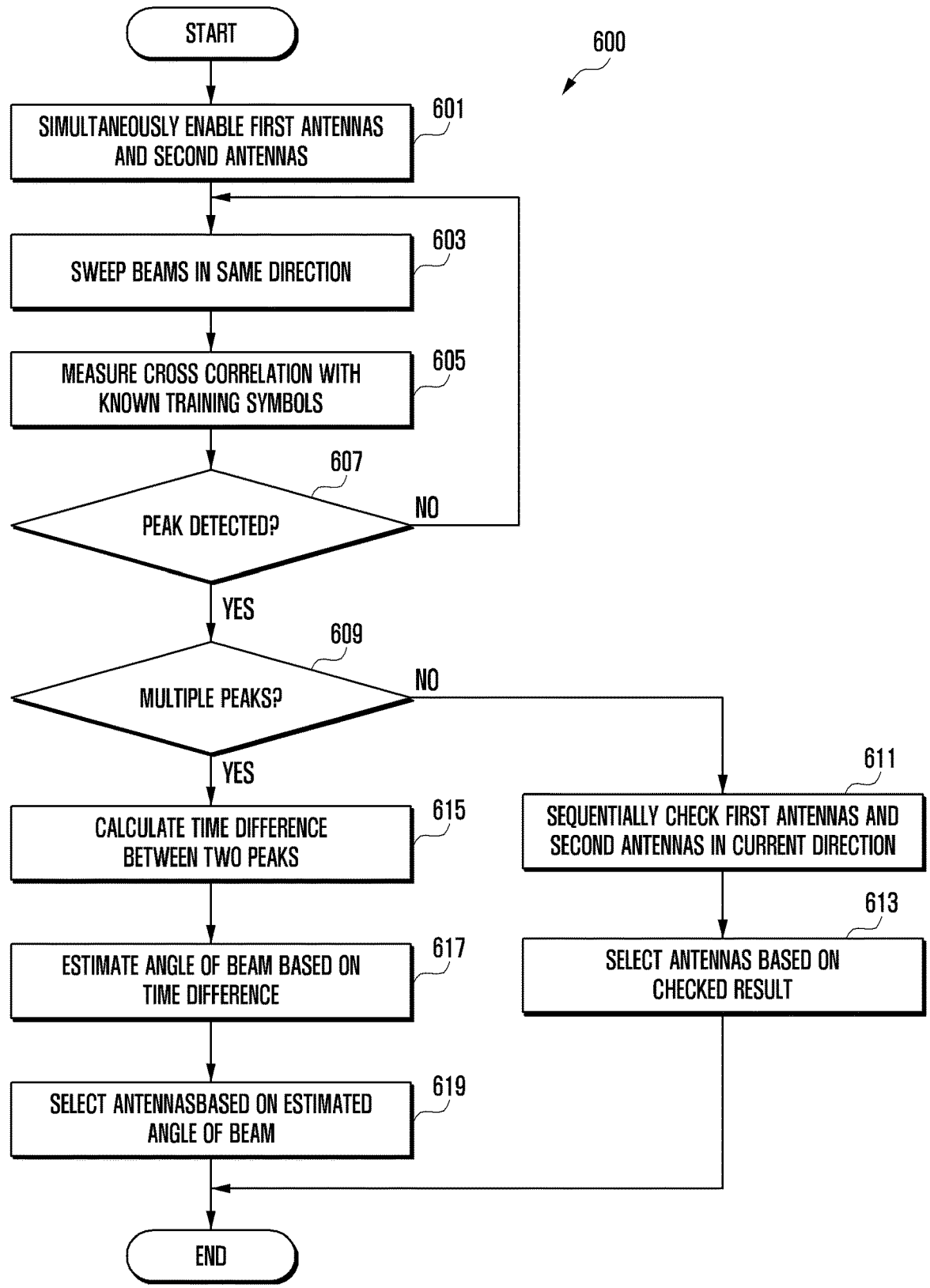
FIG. 6 is a flowchart illustrating an operation method of the electronic device according to various embodiments.

FIG. 6 is a flowchart 600 illustrating an operation method of the electronic device 101 according to various embodiments. FIGS. 7, 8, 9, 10 and 11 are reference diagrams for a detailed description of some operations according to FIG. 6.

With reference to FIG. 6, at operation 601, the processor 120 (e.g., at least one processor including a processing circuit) (or communication chipset 200 in FIG. 2A or function processing module 400 in FIG. 4) of the electronic device 101 may simultaneously enable first antennas (e.g., first antenna array 310 in FIG. 3) and second antennas (e.g., second antenna array 320 in FIG. 3).

At operation 601, the processor 120 (e.g., beam sweep control module 410 in FIG. 4) may sweep the beams in the same direction. According to an embodiment, the processor 120 may control to simultaneously sweep beams of the first antennas and beams of the first antennas in the same direction. An example of this is shown in FIG. 7.

Figure 7:
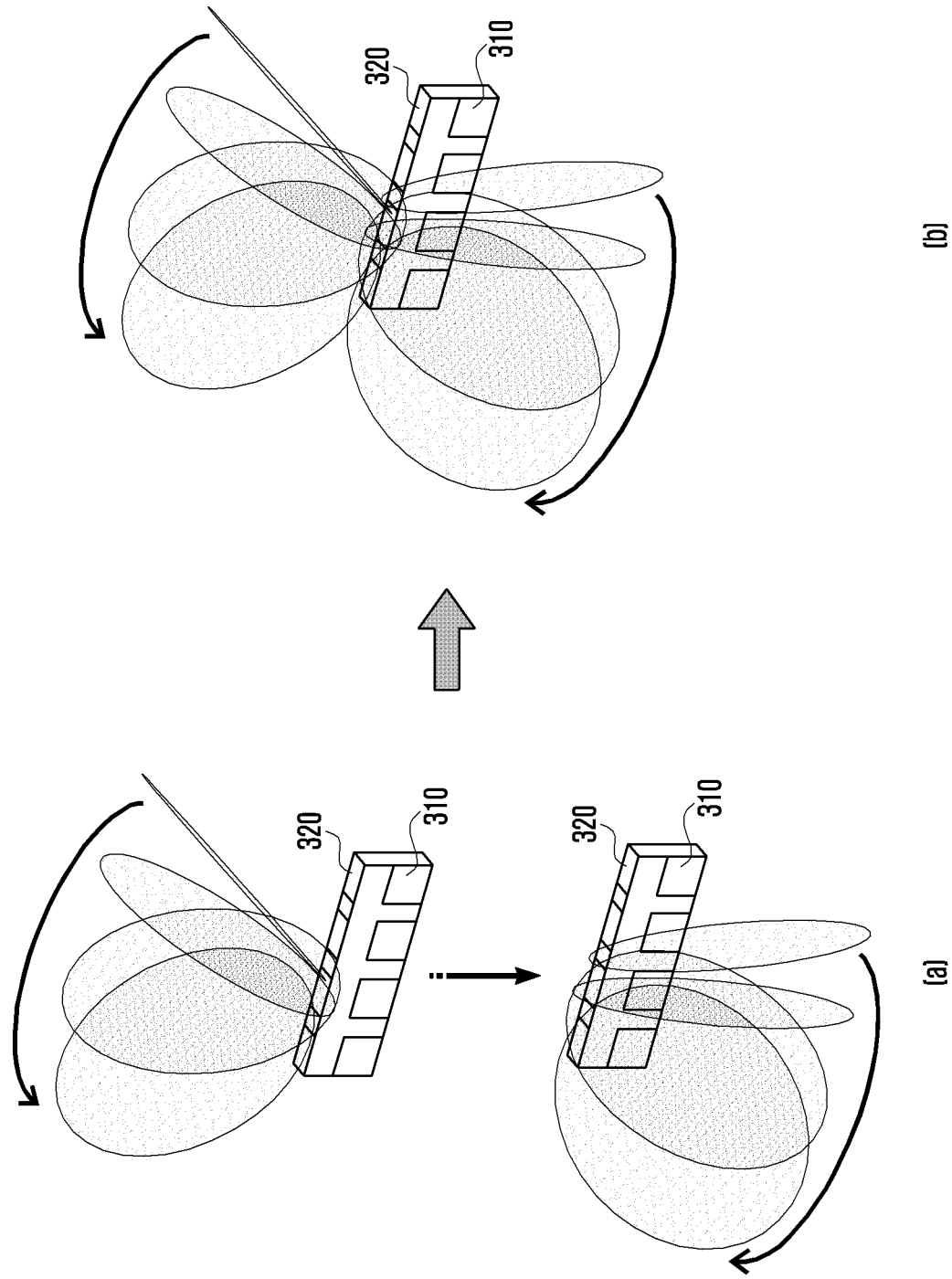
FIG. 7 is a diagram illustrating an example of beam sweeping of plural antenna arrays according to various embodiments.

FIG. 7 may illustrate an example of beam sweeping of plural antenna arrays. As shown in FIG. 7, in illustration (A) and illustration (B), the first antenna array 310 may be disposed on one surface of a circuit board (e.g., PCB), and the second antenna array 320 may be disposed on a surface different from the one surface (e.g., side surface of the circuit board). With reference to FIG. 7, in illustration (A), beam sweeping may be performed sequentially in the first antenna array 310 and the second antenna array 320 as a general beam sweep method. For example, after the first antenna array 310 and the second antenna array 320 are simultaneously enabled, the first antenna array 310 may complete beam sweeping in one direction first and then the second antenna array 320 may perform beam sweeping in the same direction (e.g., one direction). In illustration (B), as a beam sweep method according to various embodiments, for example, after the first antenna array 310 on one surface and the second antenna array 320 on a surface (e.g., surface surface) different from the one surface are simultaneously enabled, beam sweeping may be simultaneously performed in the same direction (e.g., X-axis direction).

At operation 605, the processor 120 (e.g., cross correlation measurement module 420 in FIG. 4) may measure a cross correlation with a known synchronization signal while simultaneously sweeping the beams of the first antennas and the second antennas. According to an embodiment, the processor 120 may calculate a result of cross-correlating a signal obtained by combining the reception signals (e.g., first reception signal, second reception signal) with a known synchronization signal.

At operation 607, the processor 120 (e.g., peak detection module 430 in FIG. 4) may determine whether a peak is detected based on the measurement result.

According to various embodiments, the processor 120 may detect a peak through cross-correlation between a signal obtained by combining the first reception signal and the second received signal, which are two different time series signals, and a known synchronization signal. According to an embodiment, one reception signal (e.g., first time series signal) among the first reception signal and the second reception signal may arrive first at one antenna array (e.g., first antenna array 310), and the other reception signal (e.g., second time series signal) may arrive at the other antenna array (e.g., second antenna array 320) at a time point delayed by some time. According to an embodiment, the processor 120 may analyze the correlation between the first time series signal and the second time series signal being delayed by some time from the first time series signal. An example of this is shown in FIG. 8.

Figure 8:
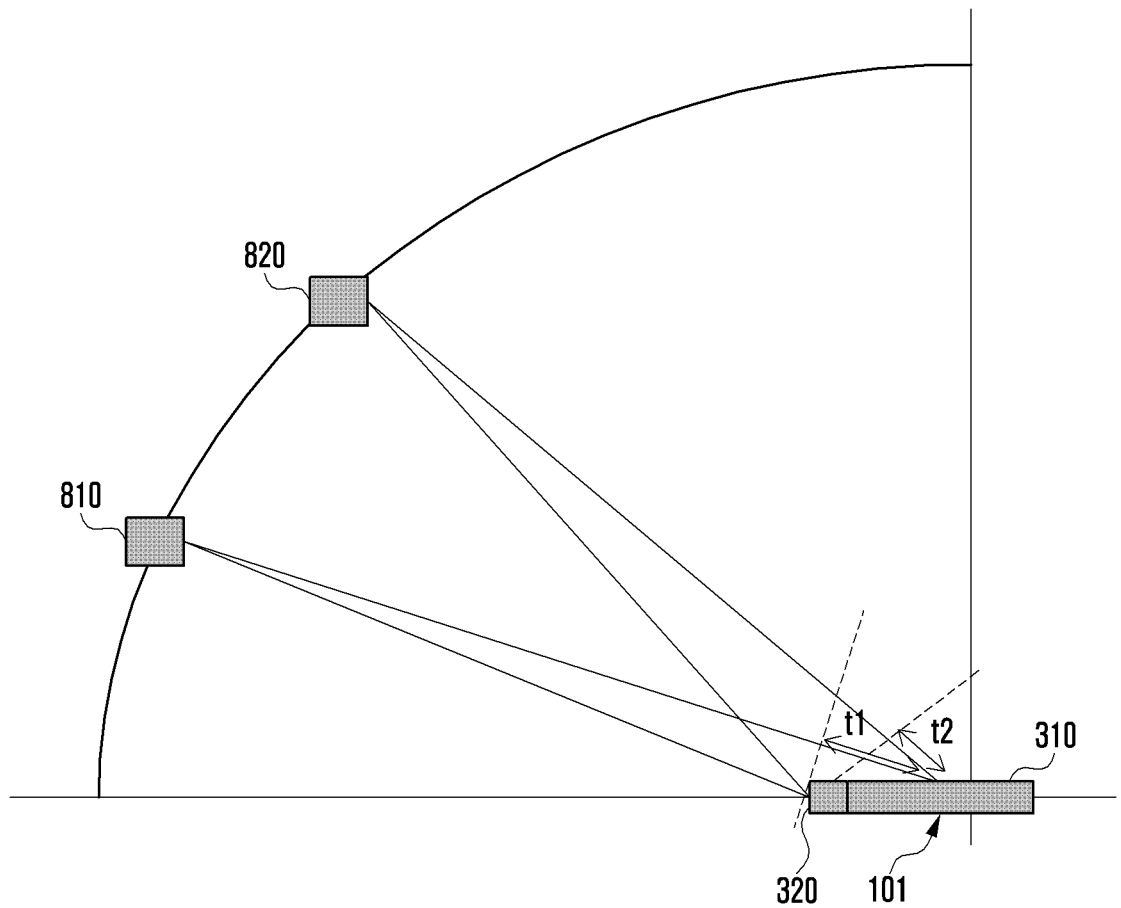
FIG. 8 is a diagram depicting an example of estimating a delay time between a first reception signal and a second reception signal in various embodiments.

FIG. 8 is a diagram depicting an example of estimating a delay time between a first reception signal and a second reception signal. As shown in FIG. 8, the electronic device 101 may include a first antenna array 310 and a second antenna array 320, and FIG. 8 may show an example of an environment where two base stations are present around the electronic device 101 (e.g., first base station 810 at position 1, second base station 820 at position 2). Referring to the example of FIG. 8, FIG. 8 can illustrate a case where the electronic device 101 receives a first reception signal through the first antenna array 310 (e.g., first time series signal) first from each base station and receives a second reception signal through the second antenna array 320 (e.g., second time series signal) at a time point delayed by some time (e.g., delay time t1, t2). According to an embodiment, the processor 120 may estimate a delay time (e.g., t1, t2)

based on the difference in time when the first reception signal and the second reception signal arrive at the first antenna array 310 and the second antenna array 320. According to an embodiment, the processor 120 may identify a signal simultaneously received by the first antenna array 310 and the second antenna array 320 (e.g., third reception signal) by using the estimated delay time as shown in Equation 1 below.

$$y = y_{firstANT} + y_{secondANT} = ax + bxe^{jt} \quad \text{Equation 1}$$

In Equation 1, yfirstANT may indicate a signal received by the first array antenna 310 (e.g., first reception signal), ysecondANT may indicate a signal received by the second array antenna 320 (e.g., second reception signal), x may indicate a known synchronization signal (e.g., known beam training symbols), a and b may indicate channel gains including antenna gains of two antenna arrays (e.g., first antenna array 310, second antenna array 320), t may indicate a delay time between reception signals received respectively by the two antenna arrays, and y may indicate a reception signal received when the first antenna array 310 and the second antenna array 320 simultaneously receive a signal. For example, y may indicate a signal obtained by an n-way combiner (e.g., Rx combiner) combining base station transmission beam signals received by the first antenna array 310 and the second antenna array 320.

According to various embodiments, the processor 120 may perform cross correlation by using the combined signal (y) and the known synchronization signal (x) as shown in Equation 2 below.

$$\text{Corr} = (x \times y)(\tau) \quad \text{Equation 2}$$

In Equation 2, x may indicate a known synchronization signal, y may indicate a reception signal obtained by Equation 1 (e.g., signal obtained by an n-way combiner combining signals), and τ may indicate a certain time. For example, the processor 120 may obtain a peak value of received signals by performing a cross correlation based on the first reception signal having arrived first (e.g., first time series signal) and the second reception signal having arrived after some time delay (e.g., second time series signal). According to an embodiment, when a peak value is obtained, the point at which the corresponding peak value appears may indicate a point in time at which a time delay occurs. According to an embodiment, the processor 120 may calculate the time difference based on peak values indicated by cross correlation (i.e., combined signal) between a signal obtained by combining the first reception signal and the second reception signal and a known synchronization signal.

With reference back to FIG. 6, if no peak is detected at operation 607 ("no"—branch of operation 607), the processor 120 (e.g., peak detection module 430 in FIG. 4) may proceed to operation 603 and perform operation 603 and subsequent operations.

If a peak is detected at operation 607 ("yes"—branch of operation 607), at operation 609, the processor 120 (e.g., peak detection module 430 in FIG. 4) may determine whether plural peaks are detected. For example, the processor 120 may detect a first peak related to the first antennas and a second peak related to the second antennas.

If plural peaks are not detected at operation 609 ("no"—branch of operation 609), for example, if one peak related to some of the antennas is detected, at operation 611, the processor 120 (e.g., angle estimation module 440 in FIG. 4) may sequentially check the first antennas and the second antennas in the current direction.

At operation 613, the processor 120 (e.g., beamforming module 450 in FIG. 4) may select some of the antennas (e.g., antenna array) based on the result of checking.

If plural peaks are detected at operation 609 ("yes"—branch of operation 609), at operation 615, the processor 120 (e.g., angle estimation module 440 in FIG. 4) may calculate a time difference between the peaks. An example of this is shown in FIG. 9.

FIG. 9 may show an example in which peak values of a first reception signal and a second reception signal are calculated based on cross correlation as described with reference to FIG. 8, Equation 1 and Equation 2. For example, in FIG. 9, illustration (A) may show an example for a first peak 910 related to the first reception signal (or first time series signal) and a second peak 920 related to the second reception signal (or second time series signal) in the signal output from the first base station 810 of FIG. 8. As another example, in FIG. 9, illustration (B) may show an example for a third peak 930 related to a third reception signal (or first time series signal) and a fourth peak 940 related to a fourth reception signal (or second time series signal) in the signal output from the second base station 820 of FIG. 8. According to an embodiment, the processor 120 may identify the time difference (e.g., t1) between the first peak 910 and the second peak 920 in relation to the first base station 810, and may identify the time difference (e.g., t2) between the third peak 930 and the fourth peak 940 in relation to the second base station 820.

At operation 617, the processor 120 (e.g., angle estimation module 440 in FIG. 4) may estimate the angle (e.g., angle of arrival) of a beam (e.g., one base station transmission beam) based on the time difference. An example of this will be described with reference to FIGS. 10 and 11.

At operation 619, the processor 120 (e.g., beam forming module 450 in FIG. 4) may select (or determine) antennas (e.g., one antenna array) for communication with the base station based on the estimated angle (e.g., angle of arrival) of the beam.

Figure 10:
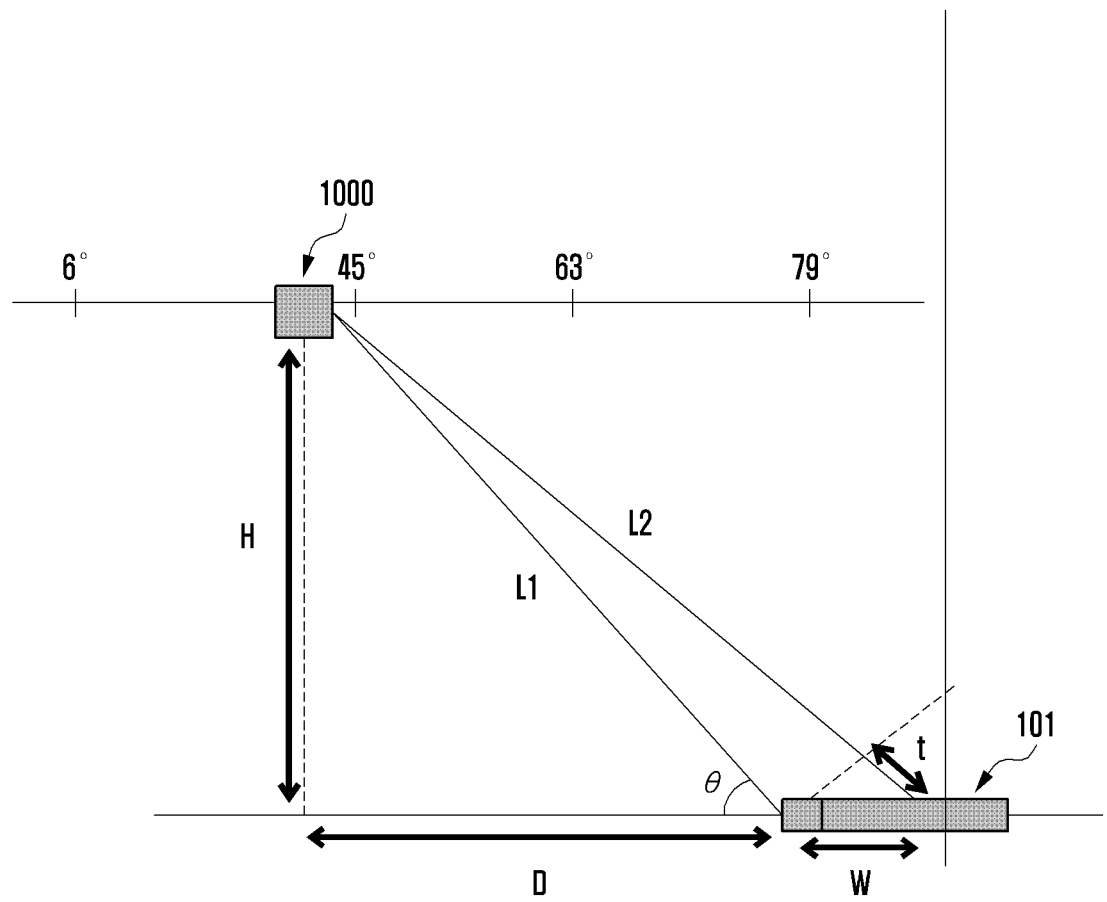

FIGS. 10 and 11 may show an example of estimating the beam angle in various embodiments.

According to an embodiment, FIG. 10 may show an example of estimating a beam angle by using a preset lookup table, and FIG. 11 may show an example of estimating a beam angle by using an approximation method.

With reference to FIG. 10, in FIG. 10, H may indicate that the base station (e.g., TRP) 1000 has a specified height (H) (e.g., 10 m) from the ground (or, electronic device 101) (e.g., the base station is installed on a street light), D may indicate a fixed horizontal distance (D) between the base station 1000 and the electronic device 101, L1 may indicate a signal arrival distance (L1) from the base station 1000 to the first antenna array 310, L2 may indicate a signal arrival distance (L2) from the base station 1000 to the second antenna array 320, W may indicate a specified separation distance (W) (e.g., 0.015 m) between the first antenna array 310 and the second antenna array 320, and t may indicate an arrival delay time (t) (or, time difference) between the first reception signal and the second reception signal.

According to various embodiments, Table 2 below may show an example created based on measurement values corresponding to the above-described elements. According to an embodiment, when the processor 120 can distinguish a signal transmission time in units of 9 psec, it can distinguish an approximate propagation distance in units of about 3 mm relative to the light speed. For example, in Table 2, the distance difference (t) between from the base station 1000 to the first antenna array and from the base station 1000 to the second antenna array may be listed at 3 mm intervals (step delta). According to an embodiment, when the height of the base station 1000 is assumed to be 10 m, the angle (θ) that can be distinguished may be determined through calculation. The delay time can be calculated from the distance difference (t) between from the base station 1000 to the first antenna array and from the base station 1000 to the second antenna array. The calculated delay time and the corresponding angle (θ) may be recorded in a lookup table, which may be stored in the memory (e.g., memory 130 in FIG. 1) of the electronic device 101. According to an embodiment, the electronic device 101 may estimate the angle (θ) only with the detected delay time by referring to the lookup table.

TABLE 2

| Distance(m) | L1(m) | L2(m) | t(m) | Step Delta | θ |
|---|---|---|---|---|---|
| 100 | 100.4988 | 100.5137 | 0.014926 |  | 6 |
| 10 | 14.14214 | 14.15275 | 0.010611 | 0.004315 | 45 |
| 5 | 11.18034 | 11.18706 | 0.006716 | 0.003323 | 63 |
| 2 | 10.19804 | 10.20099 | 0.002952 | 0.003764 | 79 |

According to various embodiments, the processor 120 may estimate the angle according to a delay time by referring to the lookup table. In one embodiment, Table 2 shows an example of dividing the angle in 4 steps (e.g., 6 degrees, 45 degrees, 63 degrees, 79 degrees), and the accuracy of the estimated angle may increase as the distance between the first antenna array 310 and the second antenna array 320 (e.g., separation distance (W)) increases.

With reference to FIG. 11, illustration (A) may show an example of an actual equiphase wave front. According to an embodiment, the equiphase wave front plane may be linearly approximated when close to the electronic device 101, and illustration (B) may show an example of an approximate equiphase wave front approximated to the actual equiphase wave front. According to an embodiment, the processor 120 may estimate the angle according to the delay time based on the approximated equiphase wave front. This may be represented by Equation 3 below.

$$\theta = \cos^{-1}(ct/0.015 \text{ m}) \quad \text{Equation 3}$$

In Equation 3, θ may indicate the beam angle, t may indicate a certain delay time, c may indicate the speed of light, and "0.015 m" may be an instance of the separation distance (W) between the first antenna array 310 and the second antenna array 320.

According to various embodiments, estimation of the angle of arrival between the base station and the antenna arrays is not limited to the examples in FIGS. 10 and 11, and various algorithms or techniques for estimating the angle of arrival may be utilized.

Figure 12:
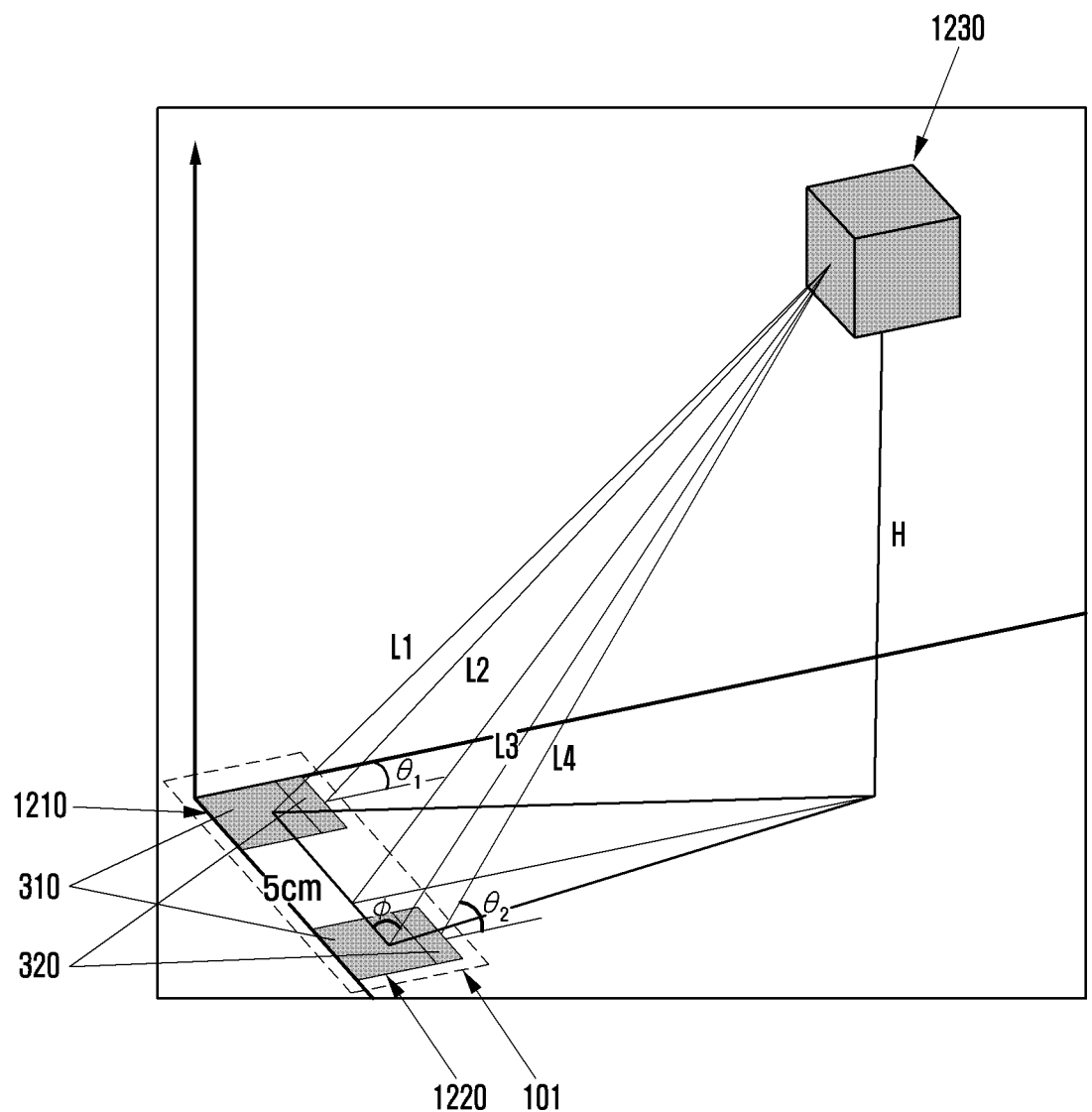
FIG. 12 is a diagram illustrating an example of estimating the beam direction in three dimensions in the electronic device according to various embodiments.

FIG. 12 is a diagram illustrating an example of estimating the beam direction in three dimensions in the electronic device 101 according to various embodiments.

As shown in FIG. 12, according to various embodiments, the electronic device 101 may include a first communication chipset 1210 and a second communication chipset 1220 for millimeter wave communication. According to an embodiment, the first communication chipset 1210 and the second communication chipset 1220 may have a configuration identical or similar to that of the communication chipset 200 described in the description with reference to FIG. 2A.

According to various embodiments, the first communication chipset 1210 and the second communication chip set 1220 may each include a first antenna array 310 and a second antenna array 320. For example, the first communication chipset 1210 may form the first antenna array 310 and the second antenna array 320 on the circuit board of the first communication chipset 1210, and the second communication chipset 1220 may form the first antenna array 310 and the second antenna array 320 on the circuit board of the second communication chipset 1220. According to an embodiment, the first communication chipset 1210 and the second communication chipset 1220 may be arranged to be spaced apart by a specified distance (e.g., about 5 cm).

According to various embodiments, the base station 1230 may be installed to have a fixed specified height (H) (e.g., about 10 m) from the ground (or electronic device 101). According to an embodiment, the base station 1230 may represent a transmit receive point (TRP) (e.g., millimeter wave base station) in millimeter wave communication.

With reference to FIG. 12, the vertical angle (e.g., θ1, θ2) can be estimated, as in the previous embodiment, through the delay time according to a first arrival distance (e.g., L1, L2) between the base station 1230 and the first communication chipset 1210, or through the delay time according to a second arrival distance (e.g., L3, L4) between the base station 1230 and the second communication chipset 1220. According to an embodiment, when the vertical angle of the first communication chipset 1210 (e.g., θ1) and the vertical angle of the second communication chipset 1220 (e.g., θ2) are the same or similar (e.g., θ1≈θ2), estimation may be possible by using one communication chipset (e.g., first communication chipset 1210 or second communication chipset 1220).

According to an embodiment, when the communication chipset is configured to include plural chipsets, such as the first communication chipset 1210 and the second communication chipset 1220, it may be possible to additionally estimate a horizontal angle (e.g., ϕ). For example, assuming that the arrival time of L1 in the first communication chipset 1210 is a first time (t1) and the arrival time of L3 in the second communication chipset 1220 is a second time (t2), the delay time may be calculated (or derived) as the difference between the first time and the second time (e.g., t1−t2), for example. According to an embodiment, when the delay time is calculated, it may be possible to estimate the horizontal angle (ϕ) by using the calculated delay time. For example, the approximation method as illustrated above can be used, and this may be shown in Equation 4 below.

$$\phi = \cos^{-1}(C \times \text{delay}/5 \text{ cm}) \quad \text{Equation 4}$$

In Equation 4, ϕ may indicate the horizontal angle, "delay" may indicate a certain delay time, c may indicate the speed of light, and "5 cm" may represent an instance of the designated separation distance between the first communication chipset 1210 and the second communication chipset 1220.

According to various embodiments, the first communication chipset 1210 and the second communication chipset 1220 may be electrically connected to a processor (e.g., processor 260 in FIG. 2A or FIG. 2B). According to an embodiment, the processor 260 may independently process reception signals of the first communication chipset 1210 and the second communication chipset 1220 to estimate the delay time by calculating only the difference in arrival time without a separate operation.

Figure 13:
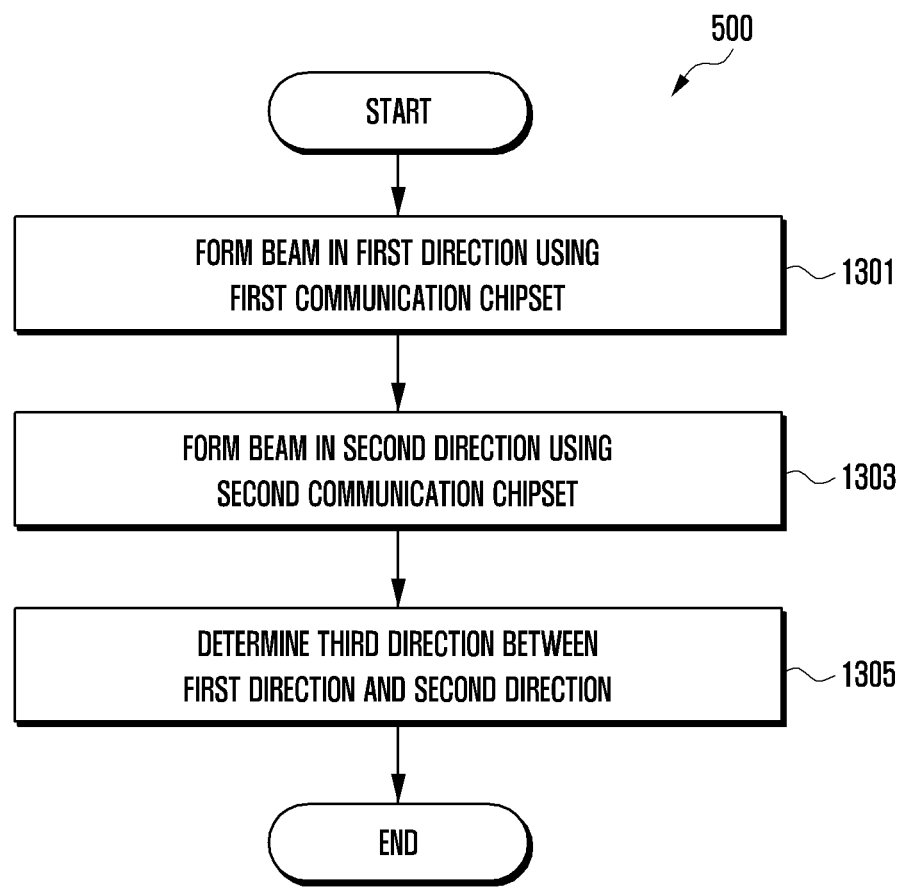
FIG. 13 is a flowchart illustrating an operation method of the electronic device according to various embodiments.
Figure 14:
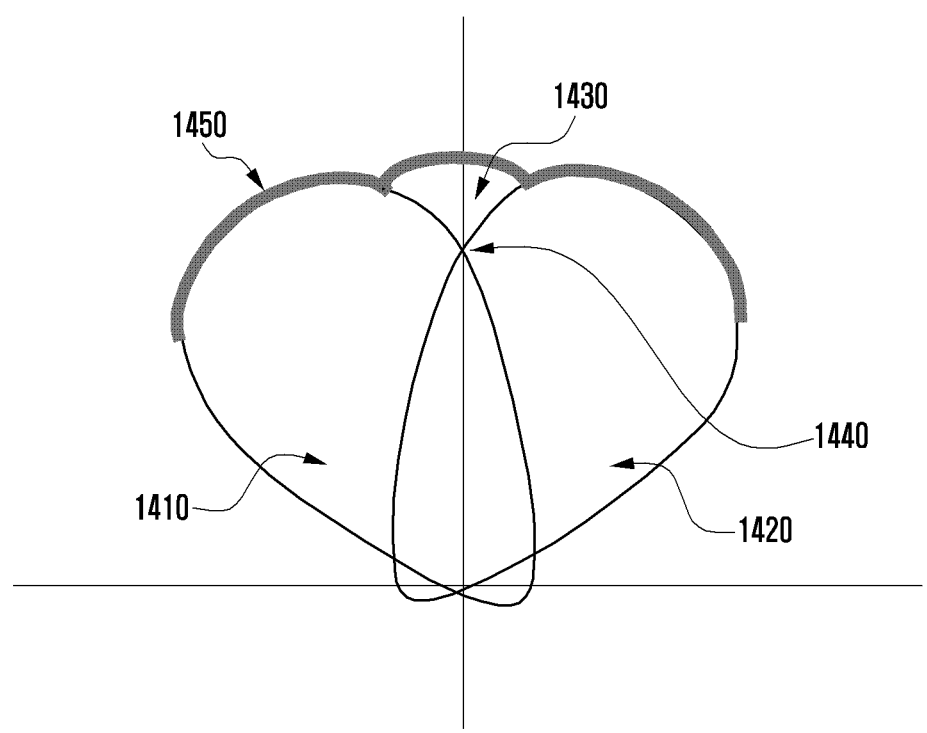
FIG. 14 is a diagram illustrating an example of estimating the beam direction in three dimensions according to FIG. 13.

FIG. 13 is a flowchart 1300 illustrating an operation method of the electronic device 101 according to various embodiments. FIG. 14 is a diagram illustrating an example of estimating the beam direction in three dimensions according to FIG. 13.

With reference to FIG. 13, at operation 1301, the processor 120 (e.g., communication chipset 200 in FIG. 2A, function processing module 400 in FIG. 4) of the electronic device 101 may control the first communication chipset 1210 to form a beam in a first direction. According to an embodiment, the processor 120 may control beam sweeping so that the antenna arrays (e.g., first antenna array, second antenna array) of the first communication chipset 1210 face in the first direction. According to an embodiment, the processor 120 may obtain a reception signal from a base station transmission beam in the first direction of the first communication chipset 1210.

At operation 1303, the processor 120 may control the second communication chipset 1220 to form a beam in a second direction. According to an embodiment, the processor 120 may control beam sweeping so that the antenna arrays (e.g., first antenna array, third antenna array) of the second communication chipset 1220 face in the second direction. According to an embodiment, the processor 120 may obtain a reception signal from a base station transmission beam in the second direction of the second communication chipset 1220.

At operation 1305, the processor 120 may determine a third direction between the first direction of the first communication chipset 1210 and the second direction of the second communication chipset 1220. According to an embodiment, the first direction and the second direction are different from each other, and the processor 120 may determine a direction between the first direction and the second direction as the third direction. According to an embodiment, the processor 120 may obtain a reception signal from a base station transmission beam in the third direction. According to an embodiment, the reception signal in the third direction may be obtained through, for example, at least one of the first communication chip set 1210 or the second communication chipset 1220. An example of this is shown in FIG. 14.

With reference to FIG. 14, reference numeral 1410 may denote a beam in a first direction formed by antenna arrays of the first communication chipset 1210 according to an embodiment, and reference numeral 1420 may denote a beam in a second direction formed by antenna arrays of the second communication chip set 1220 according to an embodiment. According to an embodiment, the electronic device 101 may form the first direction beam 1410 and the second direction beam 1420 in different directions (or opposite directions) and perform beam sweeping in the same direction. In this case, the electronic device 101 may receive signals from different directions through the first communication chipset 1210 and the second communication chipset 1220.

As shown in FIG. 14, a null point 1440 may be formed between the first direction beam 1410 by the first communication chipset 1210 and the second direction beam 1420 by the second communication chipset 1220. The null point 1440 may represent a point at which arriving electric fields are very weak because radio waves radiated from, for example, the antenna arrays of the first communication chipset 1210 and the antenna arrays of the second communication chipset 1220 are canceled. According to an embodiment, the electronic device 101 may have a wider beam reception range by forming an actual radiation pattern 1450 based on the first direction beam 1410 by the first communication chipset 1210, the second direction beam 1420 by the second communication chipset 1220, and the third direction beam 1430 relative to the null point 1440 (e.g., fixed radius from the null point 1440). According to an embodiment, as signals received by the first communication chipset 1210 and the second communication chipset 1220 are combined with a diversity method, for example, in the processor (e.g., processor 260 in FIG. 2A or FIG. 2B), a reception signal in the third direction according to the null point 1440 may be further included, improving the diversity gain.

According to various embodiments of the disclosure, an operation method of the electronic device 101 may include: obtaining a first reception signal through one or more first antennas and a second reception signal through one or more second antennas from one base station transmission beam; identifying a time difference between the first reception signal and the second reception signal; calculating an angle of the base station transmission beam at least based on a specified distance between the first antennas and the second antennas and the time difference; and adjusting the phase of a signal input to the one or more first antennas or the one or more second antennas at least based on the angle.

According to various embodiments, identifying a time difference may include calculating the time difference based on a peak value of a signal obtained by combining the first reception signal and the second reception signal.

According to various embodiments, calculating an angle of the base station transmission beam may include estimating peaks through cross correlation between the signal obtained by combining the first reception signal and the second reception signal and a known synchronization signal, and calculating the angle of the base station transmission beam based on the time difference between the peaks.

According to various embodiments, identifying a time difference may include: detecting two peaks through cross correlation using a signal obtained by combining the first reception signal obtained through the first antennas and the second reception signal obtained through the second antennas; and determining a time difference between the first reception signal and the second reception signal based on the detected peaks.

According to various embodiments, obtaining may include obtaining the first reception signal and the second reception signal by beam sweeping the first antennas and the second antennas in the same order.

Various embodiments of the disclosure disclosed in the specification and drawings are only provided for specific examples to easily explain the technical content of the disclosure and to aid understanding of the disclosure, and are not intended to limit the scope of the disclosure. Therefore, for the scope of the disclosure, it should be understood that not only the embodiments disclosed herein but also all changes or modified forms derived based on the technical idea of the disclosure will still fall within the scope of the disclosure.

The invention claimed is:

1. An electronic device comprising:
   a first antenna array including a plurality of first antennas;
   a second antenna array including a plurality of second antennas spaced apart by a specified distance from the plurality of first antennas;
   a communication circuit electrically connected to the first antenna array and the second antenna array; and
   a processor, wherein the processor is configured to:
   simultaneously perform beam sweeping of the first antenna array and beam sweeping of the second antenna array,
   obtain a signal output from a base station by combining a first reception signal received through the first antenna array and a second reception signal received through the second antenna array, wherein the first reception signal and the second reception signal are transmitted as one base station transmission beam,
determine a time difference between the first reception signal and the second reception signal,
calculate an angle of the base station transmission beam based on the time difference, and
adjust a phase of a signal received by the first antenna array or the second antenna array based on the angle of the base station transmission beam.

2. The electronic device of claim 1, wherein the processor is configured to calculate the time difference based on peak values of the signal obtained by combining the first reception signal and the second reception signal.

3. The electronic device of claim 2, wherein the processor is configured to:
combine the first reception signal received through the first antenna array and the second reception signal received through the second antenna array;
detect two peaks through cross correlation between the combined signal and a known synchronization signal; and
calculate the angle of the base station transmission beam based on a time difference between the two peaks.

4. The electronic device of claim 2, wherein the communication circuit is electrically connected to the first antenna array and the second antenna array, and is configured to obtain the first reception signal and the second reception signal by beam sweeping the first antenna array and the second antenna array in a same order.

5. The electronic device of claim 2,
wherein the plurality of first antennas include a patch antenna array composed of patch antennas, and the plurality of second antennas include a dipole antenna array composed of dipole antennas;
wherein the plurality of first antennas and the plurality of second antennas are formed on one circuit board;
wherein the plurality of first antennas are formed on one surface of the circuit board; and
wherein the plurality of second antennas are formed on a surface of the circuit board different from the one surface.

6. The electronic device of claim 2,
wherein the communication circuit includes a first communication circuit and a second communication circuit;
wherein the first communication circuit is formed to be electrically connected to the plurality of first antennas; and
wherein the second communication circuit is formed to be electrically connected to the plurality of second antennas.

7. The electronic device of claim 2,
wherein the communication circuit includes a first communication circuit and a second communication circuit;
wherein the first communication circuit is formed to be electrically connected to the plurality of first antennas and the plurality of second antennas;
wherein the second communication circuit is formed to be electrically connected to a plurality of third antennas and a plurality of fourth antennas; and
wherein the communication circuit is configured to determine a third direction between a beam in a first direction by the first communication circuit and a beam in a second direction by the second communication circuit, and obtain a reception signal at least based on the first direction, the second direction, and the third direction.

8. An electronic device comprising:
a first antenna array including a plurality of first antennas;
a second antenna array including a plurality of second antennas;
a communication circuit electrically connected to the first antenna array and the second antenna array; and
a processor,
wherein the processor is configured to:
enable the first antenna array and the second antenna array at the same time,
sweep beams of the first antenna array and beams of the second antenna array toward a same direction,
combine a first reception signal obtained through the first antenna array and a second reception signal obtained through the second antenna array,
detect two peaks through cross correlation between the combined signal and a known synchronization signal,
determine a time difference between the first reception signal and the second reception signal based on the detected peaks,
estimate an angle of a base station transmission beam based on the time difference,
determine an antenna array for communication with a base station from among the first antenna array and the second antenna array based on the angle of the base station transmission beam, and
communicate with the base station by using the determined antenna array.

9. The electronic device of claim 8,
wherein the first antenna array and the second antenna array are formed to be spaced apart by a specified distance on a circuit board; and
wherein one of the first antenna array and the second antenna array is formed on one surface of the circuit board, and another is formed on a side surface of the circuit board.

10. The electronic device of claim 9, wherein the processor is configured to estimate the angle of the base station transmission beam at least based on a preset lookup table or an approximation method.

11. An operation method of an electronic device, the operation method comprising:
simultaneously performing beam sweeping of a first antenna array and beam sweeping of a second antenna array;
obtaining a signal output from a base station by combining a first reception signal received through the first antenna array and a second reception signal received through second antenna array, wherein the first reception signal and the second reception signal are transmitted as one base station transmission beam;
determining a time difference between the first reception signal and the second reception signal;
calculating an angle of the base station transmission beam based on the time difference; and
adjusting a phase of a signal received by the first antenna array or the second antenna array based on the angle of the base station transmission beam.

12. The operation method of claim 11, wherein determining a time difference comprises calculating the time difference based on peak values of the signal obtained by combining the first reception signal and the second reception signal.

13. The operation method of claim 12, wherein calculating an angle of the base station transmission beam comprises:

combining the first reception signal received through the first antenna array and the second reception signal received through the second antenna array;

detecting two peaks through cross correlation between the combined signal and a known synchronization signal; and calculating the angle of the base station transmission beam based on the time difference between the two peaks.

14. The operation method of claim 12, wherein detecting two peaks comprises:

detecting the two peaks through cross correlation using the signal obtained by combining the first reception signal obtained through the first antenna array and the second reception signal obtained through the second antenna array.

15. The operation method of claim 11, wherein obtaining comprises obtaining the first reception signal and the second reception signal by beam sweeping the first antenna array and the second antenna array in a same order.

* * * * *